(12) United States Patent
Nanno et al.

(10) Patent No.: US 7,536,230 B2
(45) Date of Patent: May 19, 2009

(54) CONTROL METHOD, TEMPERATURE CONTROL METHOD, ADJUSTMENT METHOD, TEMPERATURE CONTROLLER, PROGRAM, RECORDING MEDIUM AND HEAT TREATMENT DEVICE

(75) Inventors: Ikuo Nanno, Otsu (JP); Takaaki Yamada, Kusatsu (JP); Masahito Tanaka, Kusatsu (JP); Yosuke Iwai, Kusatsu (JP); Takeshi Wakabayashi, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 173 days.

(21) Appl. No.: 11/476,198

(22) Filed: Jun. 28, 2006

(65) Prior Publication Data

US 2007/0010403 A1 Jan. 11, 2007

(30) Foreign Application Priority Data

Jul. 4, 2005 (JP) ............................ P2005-195293

(51) Int. Cl.
*G05B 13/02* (2006.01)
(52) U.S. Cl. ....................................................... 700/30
(58) Field of Classification Search ............. 700/28–31, 700/117–121, 299
See application file for complete search history.

(56) References Cited

U.S. PATENT DOCUMENTS

| | | | | |
|---|---|---|---|---|
| 4,984,736 A | * | 1/1991 | Reiser et al. ................. | 237/2 A |
| 6,373,033 B1 | * | 4/2002 | de Waard et al. ............. | 219/497 |
| 6,496,749 B1 | * | 12/2002 | Yamaguchi et al. ......... | 700/121 |
| 6,746,908 B2 | * | 6/2004 | Tanaka et al. ................ | 438/225 |
| 6,809,300 B2 | * | 10/2004 | Wakui et al. ................. | 219/494 |
| 6,977,359 B2 | * | 12/2005 | Kasai .......................... | 219/490 |
| 7,117,124 B2 | * | 10/2006 | Yamada ....................... | 702/185 |
| 7,218,999 B2 | * | 5/2007 | Matsunaga et al. .......... | 700/299 |
| 2002/0055080 A1 | | 5/2002 | Tanaka et al. | |
| 2004/0252625 A1 | * | 12/2004 | Yasui et al. .................. | 369/283 |
| 2005/0247266 A1 | * | 11/2005 | Patel et al. ................... | 118/719 |
| 2005/0267606 A1 | * | 12/2005 | Bartlett et al. ............... | 700/29 |
| 2006/0198633 A1 | * | 9/2006 | Tanaka et al. ............... | 396/611 |

FOREIGN PATENT DOCUMENTS

KR      2002-0025789      4/2002

OTHER PUBLICATIONS

Korea Search Report, dated Jul. 24, 2007. No translation.

* cited by examiner

*Primary Examiner*—M. N. Von Buhr
(74) *Attorney, Agent, or Firm*—Foley & Lardner LLP

(57) ABSTRACT

When a work is set on a hot plate and a heat treatment is started and the like, an addition waveform of a target temperature is formed based on a previously formed data of an adjustment value, and a temperature is controlled by adding the addition waveform to the target temperature SP, and with the data of the adjustment value, the variation in temperature of the work is prevented using an interference matrix showing a relation between the target temperature SP and the temperature of the work.

48 Claims, 18 Drawing Sheets

|  | ch1 | ch2 | ... | chp |
|---|---|---|---|---|
| Measure point 1 | $0.12(a_{11})$ | $0.03\ (a_{12})$ | ... | $0.01\ (a_{1p})$ |
| Measure point 2 | $0.21(a_{21})$ | $0.08\ (a_{22})$ | ... | $0.02\ (a_{2p})$ |
| Measure point 3 | $0.35(a_{31})$ | $0.15\ (a_{32})$ | ... | $0.04\ (a_{3p})$ |
| . | . | . | | . |
| . | . | . | | . |
| . | . | . | | . |
| Measure point k | $0.01(a_{k1})$ | $0.02\ (a_{k2})$ | ... | $0.01\ (a_{kp})$ |

$$A = \begin{array}{c} t1 \\ t2 \\ \vdots \\ tm \end{array} \begin{array}{cccc} 1 & 2 & \cdots & n \\ A_{11} & A_{12} & \cdots & A_{1n} \\ A_{21} & A_{22} & \cdots & A_{2n} \\ \vdots & \vdots & \ddots & \vdots \\ A_{m1} & A_{m2} & \cdots & A_{mn} \end{array}$$

Fig. 13

$$A_{21} = \begin{array}{c} s1 \\ s2 \\ \vdots \\ sk \end{array} \begin{array}{cccc} ch1 & ch2 & \cdots & chp \\ a_{11} & a_{12} & \cdots & a_{1p} \\ a_{21} & a_{22} & \cdots & a_{2p} \\ \vdots & \vdots & \ddots & \vdots \\ a_{k1} & a_{k2} & \cdots & a_{kp} \end{array}$$

CONTROL METHOD, TEMPERATURE CONTROL METHOD, ADJUSTMENT METHOD, TEMPERATURE CONTROLLER, PROGRAM, RECORDING MEDIUM AND HEAT TREATMENT DEVICE

BACKGROUND OF THE INVENTION

1. Field of the Invention

The present invention relates to a control method for controlling a physical state such as a temperature or pressure of an object to be controlled, a temperature control method for controlling a temperature of an object to be controlled, an adjustment device, a temperature controller, a program, a recording medium and a heat treatment device suitable for the temperature control method, and more particularly, to a technique suitable for preventing a variation in physical state such as a temperature during a transient time.

2. Description of the Background Art

Conventionally, as a heating process of a work such as a semiconductor wafer or a glass substrate for a liquid crystal, there is proposed a heat treatment in which a work is mounted on a hot plate comprising a heater and a temperature sensor and controlled so as to reach a target temperature and processed (refer to Japanese Unexamined Patent Publication No. 11-067619, for example).

Conventionally, the heat treatment of a disk-shaped work with a hot plate is performed, while preventing a variation in temperature by controlling the temperature of the hot plate so that it becomes uniform. However, even when the temperature of the hot plate is uniformly controlled, the temperature of the work and the temperature of the hot plate are not the same at a transient time such that the work is mounted on the hot plate to start heat treatment, and the temperature of the work varies in itself because its peripheral part is likely to release heat as compared with its center part.

Thus, it is difficult to bring the temperature of the work into a desired temperature state even when the temperature of the hot plate is controlled in a desired state.

SUMMARY OF THE INVENTION

The present invention was made in view of the above problems and it is an object of the present invention to enable a target object such as a work to be controlled in a desired state.

The present invention provides the following constitution in order to attain the above object.

That is, a control method according to the present invention controls a physical state of a processing device for processing a target object so that detected information of the physical state of the processing device detected at a plurality of measure points conform with target information, in which the target information is adjusted so that a physical state of the target object becomes a desired state using relation information showing a relation between the target information and the physical state of the target object.

Here, the target object means an object to be processed by the processing device, an object processed by heating, cooling and pressurizing.

The processing device means a device that performs a process such as a heating device, cooling device, molding device, and reacting device.

The physical state means various states such as a temperature, pressure, flow rate, speed or liquid level.

The detected information means information of the detected physical state such as a detected temperature, detected pressure, and detected flow rate.

In addition, the target information means information of control target of the physical state such as a target temperature, target pressure and target flow rate.

The relation information means information showing a relation between the target information and the physical state of the target object, and it is preferable that one of the physical state of the target object or the target information can predict the other.

The relation information is preferably shows a transient input and output relation from the target information to the physical state of the target object, such as a matrix or transfer function showing an interference degree, or state spacial expression.

In addition, the adjustment of the target information is not limited to a transient state and it can be applied to a normal state also.

The desirable state means a state in which the physical state of the target object is uniform, or the physical state has a desirable distribution and the like and this state is at least desirable state as compared with the state before adjustment of the target information.

According to the present invention, since the target information to bring the physical state of the target object to the desirable state is predicted from the relation information showing the relation between the target information and the physical state of the target object, and adjustment is performed based on the predicted target information, the physical state of the processing device is controlled so that it becomes the adjusted target information, so that the physical state of the target object processed by the processing device can be controlled and processed into the desirable state.

A temperature control method according to the present invention controls a temperature of a processing device for processing a target object so that each of detected temperatures of the processing device detected at a plurality of measure points conform with each of a plurality of target temperatures, in which the target temperature is adjusted so that a temperature of the target object becomes a desired temperature state using relation information showing a relation between the target temperature and the temperature of the target object.

Here, the target object means an object to be heated and/or cooled by the processing device, such as a semiconductor wafer or a glass substrate heated by a heating device, for example.

The relation information means information showing a relation between the target information and the temperature of the target object, and it is preferable that one of the temperature of the target object or the target temperature can predict the other by the relation information.

The relation information is preferably shows a transient input and output relation from the target temperature to the temperature of the target object, such as a matrix or transfer function showing a interference degree, or state spacial expression.

In addition, the adjustment of the target temperature can be applied to either state of a transient state or a normal state.

The desirable temperature state means a uniform temperature state in which a variation in temperature, for example, due to the position of the target object is prevented, or a desirable temperature distribution is provided and the like.

It is preferable that adjustment of the temperature is performed when it is necessary, when the target temperature is reset or at the transient time, for example.

According to the present invention, since the target temperature to bring the target object to the desirable temperature state is predicted from the relation information to adjust the target temperature, the temperature of the processing device is controlled so that it becomes the adjusted target temperature, so that the target object processed by the processing device can be processed in the desirable state.

According to a preferable embodiment, adjustment information is found based on the relation information and temperature distribution information of the target object before adjustment of the target temperature, and the target temperature is adjusted according to that adjustment information.

"Before adjustment" means a state before the target temperature is adjusted using the relation information, that is, before adjusted according to the present invention, so that it means the same control state as a conventional state.

The temperature distribution information of the target object means information showing a distribution of the temperature of the target object and information such as a temperature difference from the temperature at each position or a reference temperature at each position of the target object. The temperature distribution of the target object before adjustment, the variation in temperature of the target object, for example, can be grasped from this temperature distribution information.

The temperature distribution information of the target object before the target temperature is adjusted can be found as a previously measured temperature of the target object in a past process.

The adjustment information means information used in adjusting the target temperature, which may be a value of the target temperature after adjusted itself, or may be a value of the temperature to be added to or subtracted from the target temperature before adjusted as a reference. This adjustment information may be values of the temperatures at a plurality of points during a period required to adjust the target temperature, or time-series temperature data for that period. Furthermore, it may be a transfer function corresponding to the time-series temperature data.

According to this embodiment, since the desirable temperature state, a shift of the temperature from the uniform temperature state, for example, can be found from the temperature distribution information of the target object before adjusted, the target temperature is adjusted so as to solve the shift of the temperature and the target object can be processed in the desirable state.

According to one embodiment, there are provided a first step of finding the relation information showing the relation between the target temperature and a temperature of the target object at each of the plurality of measure points, based on measured temperatures of the temperature change of the target object at the plurality of measure points when the target temperature is changed, a second step of finding the temperature distribution information, based on measured temperatures of the target object at the plurality of measure points before the adjustment of the target temperature, a third step of finding the adjustment information, based on the relation information and the temperature distribution information provided by the first and second steps, respectively, and a fourth step of adjusting the target temperature based on the adjustment information provided by the third step.

Here, the plurality of measure points of the target object are preferably positions in which the temperature is to be controlled to a desired temperature in the target object, the position in which the variation in temperature is to be prevented, for example.

The variation means a variation from the average value measured from the plurality of measure points or a variation from a reference temperature detected at the reference measure point, for example.

According to this embodiment, at the first step, the relation information showing the relation between the target temperature and the temperatures of the target object at the plurality of measure points is found, at the second step, the temperature distribution information is found, at a third step, the adjustment information of the target temperature required to bring the target object to the desired temperature is found based on the relation information and the temperature distribution information, and at the fourth step, the target temperature is adjusted based on the adjustment information. Thus, the temperatures of the target object at the plurality of measure points can be adjusted to be desired temperature, so that the variation in temperature at each of the plurality of measure points can be prevented.

According to another embodiment, at the first step of finding the relation information, a stepped response waveform of the measured temperature of the target object at the plurality of measure points when each target temperature is changed stepwise is measured, and using the measured stepped response waveform, at least one response waveform of a pulsed response waveform with respect to a change of a pulsed target temperature and a triangular response waveform with respect to a change of a triangular target temperature is composed.

Here, "the response waveform is composed" means that the pulsed response waveform or the triangular response waveform is calculated based on the actually measured stepped response waveform using a principle of overlapping. By this composition, the response waveform with respect to the inputted waveforms of the various kinds of target temperatures can be found.

According to this embodiment, only by measuring the stepped response waveform of the measured temperatures of the target object at the plurality of measure points when the target temperature is individually changed stepwise, the pulsed response waveform or the triangular response waveform at the plurality of measure points when the target temperature is changed into the forms of the pulse or the triangle can be composed, so that the relation information showing the detailed relation between the target temperature and the temperatures of the target object at the plurality of measure points can be obtained using that response waveform.

According to still another embodiment, at the first step of finding the relation information, a pulsed response waveform or a triangular response waveform of measured temperatures of the target object at the plurality of measure points when the target temperature is changed into the form of a pulse or triangle individually is measured.

According to this embodiment, since the pulsed response waveform or the triangular response waveform can be directly measured, it is not necessary to compose the pulsed response waveform or the triangular response waveform by measuring the stepped response waveform. In addition, the response waveform can be further composed using the measured pulsed response waveform or the triangular response waveform.

According to a preferred embodiment, at the first step of finding the relation information, at least one response waveform of the plurality of temporally different pulsed response waveforms or the plurality of temporally different triangular response waveforms are composed, and based on the composed response waveforms, a matrix as the relation information is found.

Here, the plurality of temporally different response waveforms mean a plurality of response waveforms of the target object at the plurality of measure points corresponding to the changes of the plurality of target temperatures having time difference, respectively.

In addition, the matrix preferably shows temperature changes of the target object at the plurality of measure points with respect to the changes of the plurality of target temperatures.

According to this embodiment, since the matrix as the relation information showing the relation between the target temperature and the temperatures of the target object at the plurality of measure points is found using the temporally different response waveforms, the matrix is provided in view of the temporal interference, so that the temperature of the target object can be controlled so as to be the desired temperature state with high precision by using such matrix.

According to another embodiment, the adjustment information is an adjustment value at a predetermined point for each of the plurality of target temperatures, and at the third step, the adjustment value is calculated based on an inverse matrix of the matrix and the temperature distribution information.

Here, the predetermined set point is preferably a point in which the target object is to be controlled at the desired temperature, and it is preferable that there are plurality of points and each point is set based on a reference point, a point the treatment of the target object is started, for example.

The inverse matrix may be a pseudo-matrix.

In addition, the adjustment value may be calculated by solving a simultaneous equation without using the inverse matrix.

According to this embodiment, since the adjustment value required to eliminate the shift of the temperature can be calculated corresponding to the predetermined point using the inverse matrix from the temperature distribution information corresponding to the shift of the temperature from the desired temperature state, when the target temperature is adjusted according to this adjustment value, the shift of the temperature of the target object at the predetermined point can be eliminated and becomes the desired temperature state.

According to a preferred embodiment, at the third step, at least the adjustment value is randomly changed and an optimal value of the adjustment value is searched by a searching method using an evaluation formula including the matrix.

The searching method may be a genetic algorithm, a simulated annealing (SA) method and the like. In addition, at the third step, the calculated adjustment value is set to an initial value and the optimal value of the adjustment value may be searched by the genetic algorithm using the evaluation formula including the matrix.

According to this embodiment, since the optimal value of the adjustment value is searched by the searching method such as the genetic algorithm, when the target temperature is adjusted using the searched adjustment value, the temperature of the target object can be controlled so as to be the desired temperature state with high precision.

An adjustment device according to the present invention controls a temperature of a processing device for processing a target object so that each of temperatures of the processing device detected at a plurality of measure points conform with each of a plurality of target temperatures, and finds adjustment information of a temperature controller for adjusting the target temperature according to the adjustment information, and comprises an calculating device for calculating the adjustment information for adjusting the temperature of the target object to a desired temperature state, using relation information showing a relation between the target temperature and the temperature of the target object.

Here, the relation information may be stored in a storage of that adjustment device or the relation information stored in an external memory device may be read and used, or the relation information may be calculated based on the measured data.

It is preferable that the adjustment device and the temperature controller are connected wirelessly or through a wire, and the adjustment information calculated by the calculating device is transmitted to the temperature controller through a network.

According to the present invention, since the adjustment information of the target temperature to bring the target object to the desired temperature state is calculated using the relation information, when the adjustment information is applied to the temperature controller and the temperature controller controls the temperature of the processing device by adjusting the target temperature according to the adjustment information, the target object can be processes in the desired temperature state.

According to a preferred embodiment, the calculating device calculates the adjustment information based on the relation information and temperature distribution information of the target object before adjustment of the target temperature.

According to this embodiment, the shift of the temperature from the desired temperature state is calculated from the temperature distribution information of the target object before adjusted and the adjustment information required to eliminate the shift of the temperature can be calculated.

According to one embodiment, the calculating device comprises a first calculating unit for calculating the relation information showing a relation between the target temperature and temperatures of the target object at the plurality of measure points based on measured temperatures of the target object at the plurality of measure points when the target temperature is changed, and a second calculating unit for calculating the temperature distribution information based on the measured temperatures of the target object at the plurality of measure points before adjustment of the target temperature.

Here, data of measured temperatures of the target object at the plurality of measure points when the target temperature is changed or measured temperatures measured of the target object at the plurality of measure points before adjustment of the target temperature may be data previously measured and stored in a file and the like, or may be data of the measured temperature by measuring them by connecting a measurement device such as a temperature logger to the adjustment device.

According to this embodiment, the first calculating unit calculates the relation information showing the relation between the target temperature and the temperatures of the target object at the plurality of measure points based on the measured temperatures of the target object at the plurality of measure points when the target temperature is changed, and the second calculating unit calculates the temperature distribution information based on the measured temperatures of the target object at the plurality of measure points before adjusted, and calculates the adjustment information based on the calculated relation information and the temperature distribution information.

According to another embodiment, the first calculating unit composes at least one response waveform of a pulsed response waveform with respect to the pulsed change of the target temperature and the triangular response waveform with respect to the triangular change of the target temperature, using the stepped response waveform of the measured temperatures of the target object at the plurality of measure points when the target temperature is individually changed stepwise.

According to this embodiment, only by measuring the stepped response waveform of the measured temperatures of the target object at the plurality of measure points when the target temperature is individually changed stepwise, the pulsed response waveform or the triangular response waveform at the plurality of measure points when the target temperature is changed into the forms of the pulse or the triangle can be composed, so that the relation information showing the detailed relation between the target temperature and the temperatures of the target object at the plurality of measure points can be obtained using that response waveform.

According to still another embodiment, the first calculating unit calculates the pulsed response waveform or the triangular response waveform of the target object at the plurality of measure points when the target temperature is individually changed into the form of a pulse or triangle.

According to this embodiment, since the pulsed response waveform or the triangular response waveform can be directly measured, it is not necessary to compose the pulsed response waveform or the triangular response waveform by measuring the stepped response waveform. In addition, the response waveform can be further composed using the measured pulsed response waveform or the triangular response waveform.

According to preferred embodiment, the first calculating unit composes at least one response waveforms of the plurality of temporally different pulsed response waveforms or the plurality of temporally different rectangular response waveforms, and calculates a matrix as the relation information based on the composed response waveform.

According to this embodiment, since the matrix as the relation information showing the relation between the target temperature and the temperatures of the target object at the plurality of measure points is found using the temporally different response waveforms, the matrix is provided in view of the temporal interference, so that the temperature of the target object can be controlled so as to be the desired temperature state with high precision by using such matrix.

According to another embodiment, the adjustment information is an adjustment value at a predetermined point for each of the plurality of target temperatures, and the calculating device calculates the adjustment value based on an inverse matrix of the matrix and the temperature distribution information.

According to this embodiment, since the adjustment value required to eliminate the shift of the temperature can be calculated corresponding to the predetermined point using the inverse matrix from the temperature distribution information corresponding to the shift of the temperature from the desired temperature state.

According to a preferred embodiment, the calculating device changes at least the adjustment value randomly, and searches an optimal value of the adjustment value by a searching method using an evaluation formula including the matrix.

According to this embodiment, the optimum value of the adjustment value is searched by the searching method such as a genetic algorithm, the adjustment value can be provided a high-precision adjustment value.

In addition, an adjustment device according to the present invention controls a temperature of a processing device for processing a target object so that each of temperatures of the processing device detected at a plurality of measure points conform with each of a plurality of target temperatures and finds the adjustment information of a temperature controller for controlling the garget temperature according to the adjustment information, and comprises a calculating device for calculating the adjustment information for adjusting the temperature of the target object to a desired temperature state, based on the measured temperatures of the target object at the plurality of measure points when the target temperature is changed and the measured temperatures of the target object at the plurality of measure points before adjustment of the target temperature.

According to the present invention, since the adjustment information of the target temperature to bring the target object to the desired temperature state is calculated based on the measured temperatures of the target object at the plurality of measure points when the target temperature is changed and the measured temperatures of the target object at the plurality of measure points before adjustment of the target temperature, when the adjustment information is applied to the temperature controller and the temperature controller controls the temperature of the processing device by adjusting the target temperature according to the adjustment information, the target object can be processes in the desired temperature state.

According to a preferred embodiment, the desired temperature state is a state in which a variation in measured temperatures of the target object at the plurality of measure points is prevented, and the target object is put on the processing device and a heat treatment is performed.

Here, the variation prevented state means a state in which a variation is reduced as compared with a state before the target temperature is adjusted.

According to this embodiment, the target object is heat-treated in the uniform temperature state in which the variation is prevented.

According to another embodiment, the temperature distribution information is set as corresponding set information and the calculating device calculates the adjustment information based on the relation information and the set information.

Here, the temperature distribution information means temperature distribution information of the target object before adjusted, and the "before adjusted" means before the target temperature is adjusted according to the adjustment information, that is, before adjustment according to the present invention, and the temperature distribution information of the target object means information showing the distribution of the temperature of the target object.

The set information is information corresponding to the temperature distribution information, which is set for that adjustment device by a user. The set information is preferably information of a temperature difference from the temperature at each position of the target object or a desirable temperature of each position.

According to this embodiment, the calculating device does not need to calculate the temperature distribution, so that the adjustment information can be calculated so as to eliminate the shift of the temperature from the desired temperature state, using the set information set corresponding to the temperature distribution information.

According to still another embodiment, the temperature controller controls the temperature based on deviation between the target temperature and the detected temperature, and adjusts at least one of the target temperature and the detected temperature according to the adjustment information.

Since the temperature controller controls to reduce a deviation between the target temperature and the detected temperature, according to this embodiment, the detected temperature is adjusted instead of the target temperature, to provide the same effect when the target temperature is adjusted, or both target temperature and the detected temperature may be adjusted to provide the same effect.

In addition, an adjustment device according to the present invention controls a temperature of a processing device for processing a target object by applying an operation amount to an operating device so that each of temperatures of the processing device detected at a plurality of measure points conform with each of a plurality of target temperatures, and finds the adjustment information of a temperature controller for adjusting the operation amount so that the temperature of the target object becomes a desired temperature state according to the adjustment information, and comprises a calculating device for calculating the adjustment information using relation information showing a relation between the operation amount and the temperature of the target object.

Here, the operating device means a device for operating the processing device according to an operation amount from the temperature controller, a device for heating and/or cooling the processing device, for example.

Adjusting of the target temperature of the temperature controller is equal to adjusting of the operation amount changing in response to the target temperature, so that the operation amount may be employed instead of the target temperature in the above embodiments.

According to this embodiment, the adjustment information is calculated using the relation information showing the relation between the operation amount and the temperature of the target object, and the temperature controller adjusts the operation amount according to the adjustment information, so that the target object can be processed in the desired temperature state.

A temperature adjustment device according to the present invention controls a temperature of a processing device for processing a target object so that each of temperatures of the processing device detected at a plurality of measure points conform with each of a plurality of target temperatures, in which the target temperature is adjusted according to the adjustment information found by the adjustment device according to the present invention.

It is preferable that the temperature controller receives the adjustment information from the network and stores it in the memory unit in the temperature controller.

According to the present invention, when the target temperature is adjusted according to the adjustment information, the target object can be processed in the desired temperature state.

In addition, a temperature adjustment device according to the present invention controls a temperature of a processing device for processing a target object so that each of temperatures of the processing device detected at a plurality of measure points conform with each of a plurality of target temperatures, and adjusts the target temperature according to adjustment information, and comprises an calculating device for calculating the adjustment information for adjusting the temperature of the target object to a desired temperature state, using relation information showing a relation between the target temperature and the temperature of the target object.

According to the present invention, since the adjustment information of the target temperature to bring the target object to the desired temperature state is calculated using the relation information and the temperature of the processing device is controlled by adjusting target temperature according to this adjustment information, the target object can be controlled in the desired temperature state.

A program according to the present invention controls a temperature of a processing device for processing a target object so that each of temperatures of the processing device detected at a plurality of measure points conform with each of a plurality of target temperatures, and finds the adjustment information of the temperature controller for adjusting the target temperature according to adjustment information, by which a computer executes a first step of calculating relation information showing a relation between the target temperature and the temperature of the target object, and a second step of calculating the adjustment information for adjusting the temperature of the target object to a desired temperature state based on the relation information and the temperature distribution information of the target object before adjustment of the target temperature.

According to the present invention, since the program is executed by the computer, the first step calculates the relation information showing the relation between the target temperature and the temperature of the target object, and the second step calculates the adjustment information for adjusting the temperature of the target object to the desired temperature state based on the relation information and the temperature distribution information of the target object before adjusted. Thus, when the adjustment information is applied to the temperature controller and the temperature controller controls the temperature of the processing device by adjusting the target temperature according to the adjustment information, the target object can be processed in the desired temperature state.

According to a preferred embodiment, the temperature distribution information is set as corresponding set information, and at the second step, the adjustment information is calculated based on the relation information and the set information.

According to this embodiment, it is not necessary to calculate the temperature distribution information, so that the adjustment information can be calculated by using the set information that is set and inputted to the computer.

According to another embodiment, the first step calculates the relation information showing the relation between the target temperature and the temperatures of the target object at the plurality of measuring points, based on the measured temperatures of the target object at the plurality of measure points when the target temperature is changed, and the second step calculates the temperature distribution information based on the measured temperatures of the target object at the plurality of measure points before adjustment of the target temperature.

According to this embodiment, since the first step calculates the relation information showing the relation between the target temperature and the temperature of the target object, based on the measured temperatures of the target object at the plurality of measure points when the target temperature is changed, and the second step calculates the temperature distribution information based on the measured temperatures of the target object at the plurality of measure points before adjustment of the target temperature, the adjustment information can be calculated based on the calculated relation information and temperature distribution information.

According to a preferred embodiment, at the first step, at least one response waveform of a pulsed response waveform with respect to a pulsed change of a target temperature and triangular response waveform with respect to a trianbular change of a target temperature is composed, using a stepped response waveform of the measured temperatures of the target object at the plurality of measure points when the target temperature is individually changed stepwise.

According to this embodiment, only by measuring the stepped response waveform of the measured temperatures of the target object at the plurality of measure points when the target temperature is individually changed stepwise, the pulsed response waveform or the triangular response waveform at the plurality of measure points when the target temperature is changed into the forms of the pulse or the triangle can be composed, so that the relation information showing the detailed relation between the target temperature and the temperatures of the target object at the plurality of measure points can be obtained using that response waveform.

According to still another embodiment, at the first step, a pulsed response waveform or triangular response waveform of a measured temperature of the target object at the plurality of measure points when the target temperature is changed into the form of pulse or triangular individually.

According to this embodiment, since the pulsed response waveform or the triangular response waveform can be directly measured, it is not necessary to compose the pulsed response waveform or the triangular response waveform by measuring the stepped response waveform. In addition, the response waveform can be further composed using the measured pulsed response waveform or the triangular response waveform.

According to another embodiment, at the first step, at least one response waveform of the plurality of temporally different pulsed response waveforms and the plurality of temporally different triangular response waveforms are composed, and based on the composed response waveform, a matrix as the relation information is found.

According to this embodiment, since the matrix as the relation information showing the relation between the target temperature and the temperatures of the target object at the plurality of measure points is found using the temporally different response waveforms, the matrix is provided in view of the temporal interference, so that the temperature of the target object can be controlled so as to be the desired temperature state with high precision by using such matrix.

According to still another embodiment, the adjustment information is an adjustment value at a predetermined point for each of the plurality of target temperatures, and at the second step, the adjustment value is calculated based on the inverse matrix of the matrix and the temperature distribution information.

According to this embodiment, the adjustment value required to eliminate the shift of the temperature using the inverse matrix can be calculated from the temperature distribution information corresponding to the shift of the temperature from the desired temperature state, corresponding to a predetermined point.

According to another embodiment, at the second step, at least an adjustment value is randomly changed and an optimal value of the adjustment value is searched by a searching method using an evaluation formula including the matrix.

According to this embodiment, since the optimum value of the adjustment value is searched by the searching method such as a genetic algorithm, a high-precision adjustment value can be provided.

In addition, a program according to the present invention controls a temperature of a processing device for processing a target object so that a detected temperature of the processing device detected at a plurality of measure points conforms with each of a plurality of target temperatures, and finds the adjustment information of the temperature controller for adjusting the target temperature according to adjustment information, by which a computer executes a step of calculating the adjustment information for adjusting the temperature of the target object to a desired temperature state based on measured temperatures of the target object at the plurality of measure points when the target temperature is changed and a measured temperature of the target object at the plurality of measure points before adjustment of the target temperature.

According to the present invention, since the adjustment information of the target temperature to bring the target object to the desired temperature state is calculated based on the measured temperatures of the target object at the plurality of measure points when the target temperature is changed and the measured temperatures of the target object at the plurality of measure points before adjustment of the target temperature, when the adjustment information is applied to the temperature controller and the temperature controller controls the temperature of the processing device by adjusting the target temperature according to the adjustment information, the target object can be processed in the desired temperature state.

According to a preferred embodiment, in the desired temperature state, the variation in measured temperatures of the target object at the plurality of measure points is prevented, and the target object is heat-treated on the processing device.

According to this embodiment, the target object can be heat-treated in the uniform temperature state in which the variation in temperature is prevented.

A recording medium according to the present invention records the program according to the present invention so as to be read by a computer.

Here, as the recording medium, a flexible disk, hard disk, optical disk, magnetic optical disk, CD-ROM, magnetic tape, non-volatile memory car, ROM and the like may be used.

According to the present invention, when the program stored in the recording medium is read and executed by the computer, the adjustment information is calculated. Thus, when the adjustment information is applied to the temperature controller, the target object can be processed in the desired temperature state.

A heat treatment device according to the present invention comprises the temperature controller and the processing device according to the present invention, operating device for heating and/or cooling the processing device by an output of the temperature controller, and a temperature detecting device for detecting the temperature of the processing device at a plurality of detection points.

According to this embodiment, the temperature of the target object can be controlled in the desired temperature state.

According to the present invention, since the target information to bring the physical state of the target object to the desirable state is predicted from the relation information showing the relation between the target information and the physical state of the target object, and adjustment is performed based on the predicted target information, the physical state of the processing device is controlled so that it becomes the adjusted target information, so that the physical state of the target object processed by the processing device can be controlled and processed into the desirable state.

BRIEF DESCRIPTION OF THE DRAWINGS

FIG. 11 shows a detailed constitution of the interference matrix;

FIG. 12 shows a constitution of the interference matrix;

FIG. 13 shows a matrix of a part of the interference matrix shown in FIG. 12;

DESCRIPTION OF THE PREFERRED EMBODIMENTS

Embodiments of the present invention will be described with reference to the drawings hereinafter.

Embodiment 1

Figure 1:
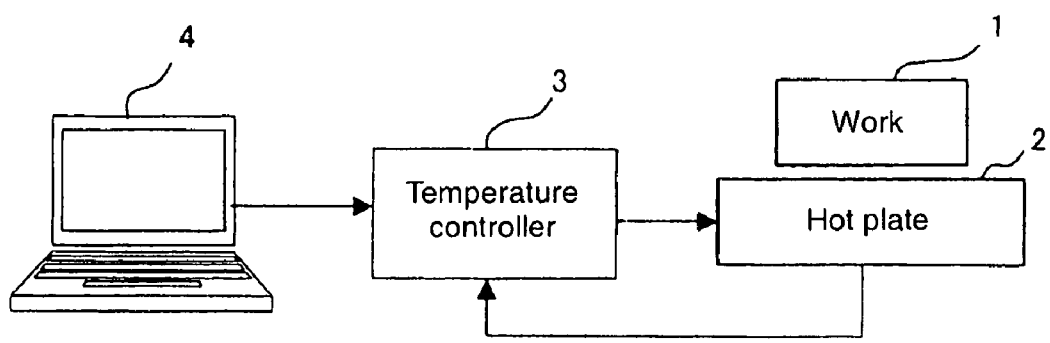
FIG. 1 shows a constitution of a heat treatment system according to one embodiment of the present invention.

According to a heat treatment system in this embodiment, as shown in FIG. 1, a heat treatment is performed for a work 1 such as a glass substrate by a hot plate 2 serving as a processing device. A temperature controller 3 controls the hot plate 2 so that its temperature becomes a target temperature by outputting an operation amount provided by a PID (proportional integral derivative) operation and the like based on a deviation between a predetermined target temperature and a detected temperature from a plurality of sensors (not shown) disposed on the hot plate 2, to a SSR (solid state relay) or magnetic switch (not shown) and the like to control carrying currents of a plurality of heaters (not shown) arranged on the hot plate 2. In this example, the hot plate 2 has a plurality of channels on which the plurality of temperature sensors and heaters are arranged, and the temperature is controlled in each channel.

The work 1 heat-treated by the hot plate 2 is a rectangular glass substrate, for example, and it is automatically loaded on the hot plate 2 sequentially by loading device (not shown) to be heat-treated. In the heat treatment process of the work 1, the temperature of the plurality of works 1 sequentially heat-treated is not measured but the temperature of the hot plate 2 is controlled by the temperature controller 3.

According to the heat treatment of the work 1, when the work 1 is mounted on the hot plate 2 that is stabilized at a target temperature and the heat treatment is started, a temperature varies on a surface of a disk-shaped work 1 due to a difference in heat loss on the surface of the work 1.

Figure 2:
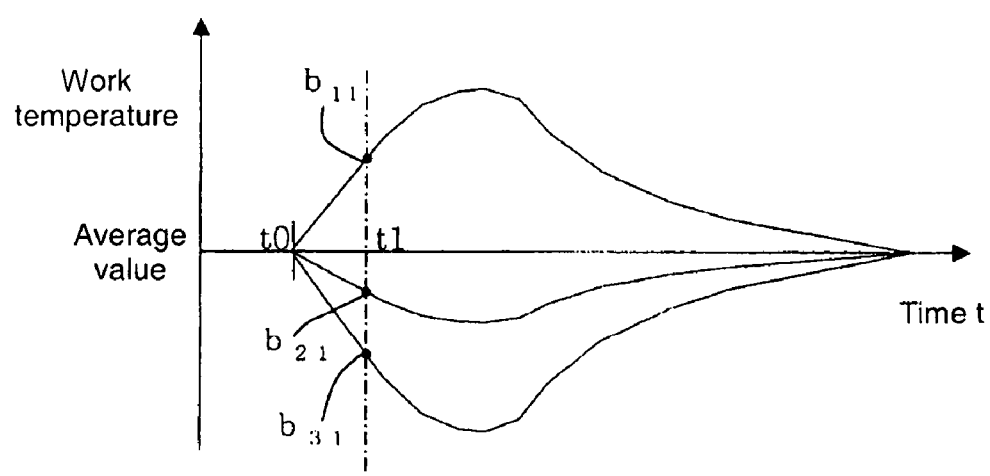
FIG. 2 shows a variation of a measured temperature at each measure point of a work 1 from an average value.

FIG. 2 shows a variation in measured temperature at a plurality of measure points of the test work 1 mounted on the hot plate 2 stabilized at the target temperature when the heat treatment is performed for the work 1 on which the temperature sensor is mounted. In FIG. 2, a horizontal axis shows a time and a vertical axis shows a measured temperature at each of the plurality of measure points as a temperature difference from an average value of measured temperatures. In addition, in FIG. 2, temperatures measured at three points are representatively shown.

As shown in FIG. 2, the measured temperature varies just after the test work 1 is mounted on the hot plate 2 at the time of starting the heat treatment, that is, t=t0, and after a maximum variation, the variation gradually becomes small and the temperature becomes uniform.

In order to perform the heat treatment for the work 1 uniformly, it is necessary to prevent the variation in temperature on the surface of the work 1 and bring the measured temperature at each measure point close to the average value, and it is desired to perform the heat treatment in a desired state in which the variation in temperature of the work 1 is eliminated.

According to this embodiment, in order to prevent the variation in temperature on the surface of the work 1, the temperature of the hot plate 2 shown in FIG. 1 is controlled and more specifically, the target temperature of the temperature controller 3 for controlling the temperature of the hot plate 2 is adjusted during a transient time in which the work 1 is mounted on the hot plate 2 and heat-treated. By adjusting the target temperature, a distribution of the temperature to prevent the variation in temperature of the work 1 is formed on the hot plate 2, and with the temperature distribution formed on the hot plate 2, the temperature of the work is prevented from varying. That is, by adjusting the target temperature, a variation in temperature is generated on the hot plate 2 so that the variation in temperature of the work 1 is eliminated.

Thus, as shown in FIG. 1, adjustment information to adjust the target temperature is applied from a personal computer 4 serving as an adjustment device to the temperature controller 3 through the network as will be described below, and the temperature controller 3 adjusts the target temperature based on the adjustment information. In addition, the adjustment device is not limited to the personal computer, it may be a PLC (Programable Logic Controller) and the like.

In order to prevent the temperature of the work 1 from varying by adjusting the target temperature of the temperature controller 3, it is necessary to grasp a relation between the target temperature of the temperature controller 3 and the temperature of the work 1.

For example, if it can be predicted that how the temperature of the work changes when the target temperature is changed in some way, it can be predicted how to adjust the target temperature to change the temperature of the work 1 to prevent its variation.

Thus, relation information showing the relation between the target temperature and the temperature of the work 1 is to be found as follows.

More specifically, an influence of temperature change of the work 1 with respect to the change of the target temperature of each channel is measured and the impact of the change in target temperature on the temperature of the work 1 is found as a matrix.

Here, when the heating of the hot plate 2 is controlled by the heater by changing the target temperature of each channel, a heat interference is generated due to the heater of each channel and the matrix shows the influence of this interference, so that this matrix is referred to as the interference matrix hereinafter.

Figure 3:
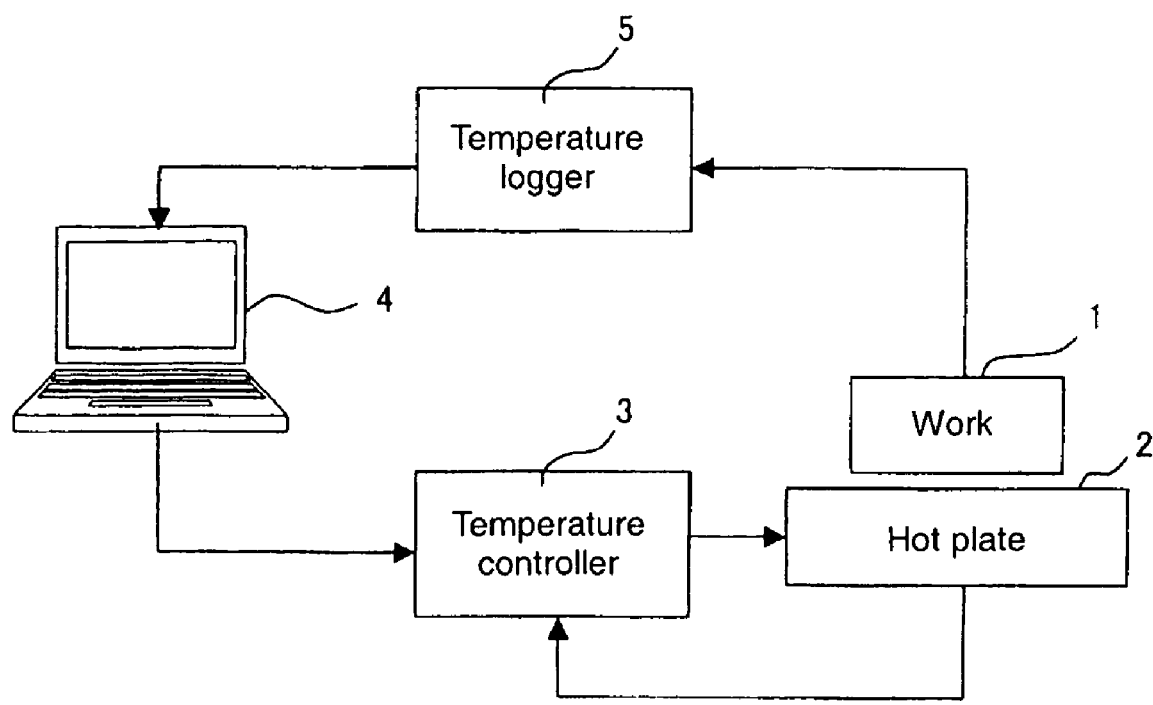
FIG. 3 shows a system constitution to measure a temperature of the work 1.

FIG. 3 shows an example of a constitution to measure the influence of the temperature change of the work 1 with respect to the change in target temperature, and the same reference numerals are allotted to the corresponding component in FIG. 1.

In FIG. 3, reference numeral 1 designates a test work on which a plurality of sensors (not shown) are mounted at a plurality of measure points, reference numeral 5 designates a temperature logger to measure the temperature of the test work 1, and a personal computer 4 is connected to the temperature logger 5 and the temperature controller 3. The personal computer 4 can change the target temperature of the temperature controller 3 through communication with the temperature logger 5 and the temperature controller 3, and it can measure the target temperature and the temperature of the test work 1 at each measure point synchronously. As the plurality of measure points of the work 1, a plurality of positions in which the variation in temperature is to be prevented are selected.

A recording medium such as a CD-ROM in which a program according to the present invention is stored is set in the personal computer 4 that has a function as a calculating device for calculating the interference matrix and adjustment information by reading the program from the recording medium and executing it.

Figure 4A:
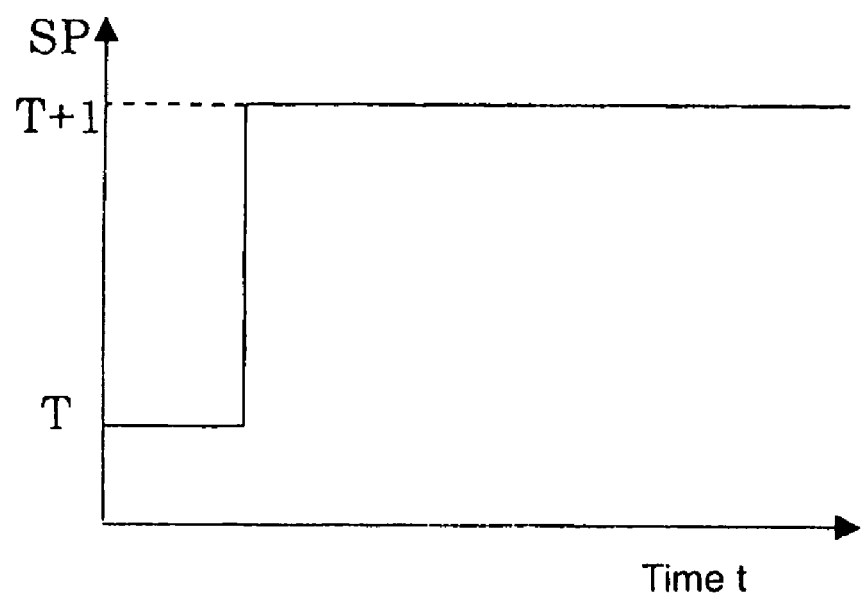
FIG. 4 shows a stepped input and a stepped response waveform.

First, the test work 1 is set on the hot plate 2 and a target temperature SP of the whole channels in the temperature controller 3 is set to a predetermined temperature T for the heat treatment as shown in FIG. 4A. Thus, the temperature control is started.

Figure 4B:
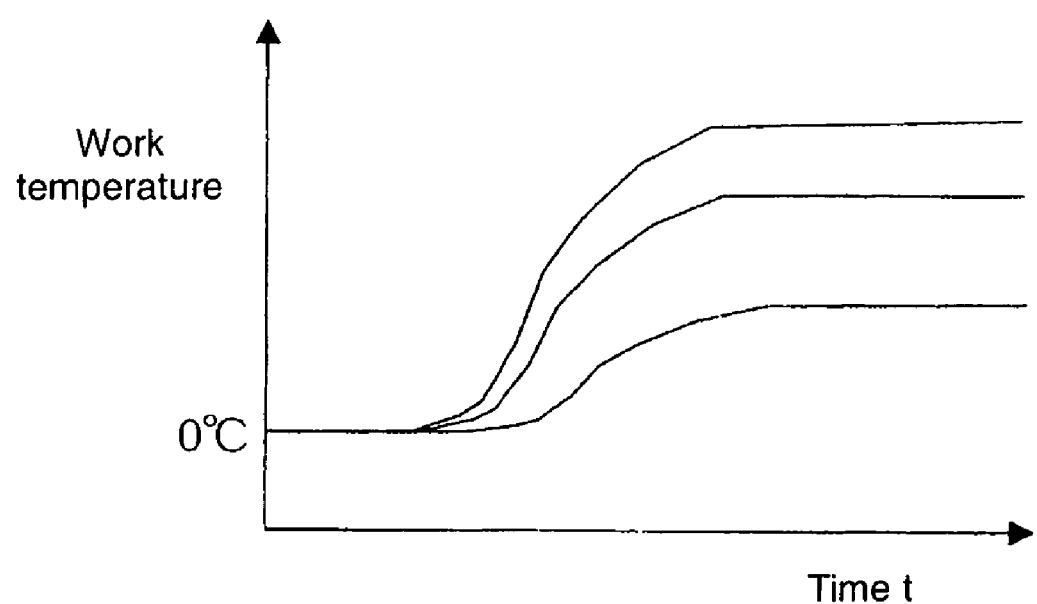

In a state the temperature of the hot plate 2 reaches the predetermined temperature T and stabilized, as shown in FIG. 4A, the target temperature SP of a first channel ch1 is changed by 1° C., for example to be T+1 stepwise, and the temperature of the test work 1 at that time is measured at the plurality of measure points as shown in FIG. 4B. In FIG. 4B, three waveforms of the temperature change of the measured temperature at three measure points are representatively shown and the temperature before changed is set to 0° C.

Similarly, in a state the hot plate 2 mounting the test work 1 reaches the predetermine temperature T and stabilized, the target temperature of a second channel ch2 is changed by 1° C. stepwise, and the temperature of the test work 1 is measured at the plurality of measure points.

Thus, in a similar way, the target temperature SP is sequentially changed by 1° C. stepwise every channel and the temperature of the test work 1 is measures at the plurality of measure points.

Thus, there can be provided a stepped response waveform showing how the measured temperatures at the plurality of measure points in the work 1 are changed when the target temperature of each channel is changed by 1° C. stepwise.

Using the thus measured stepped response waveforms, response waveforms at the plurality of measure points in the work 1 with respect to the various kinds of changes in target temperature such as the change in target temperature in the form of a pulse or triangle are calculated and composed.

Figure 5A:
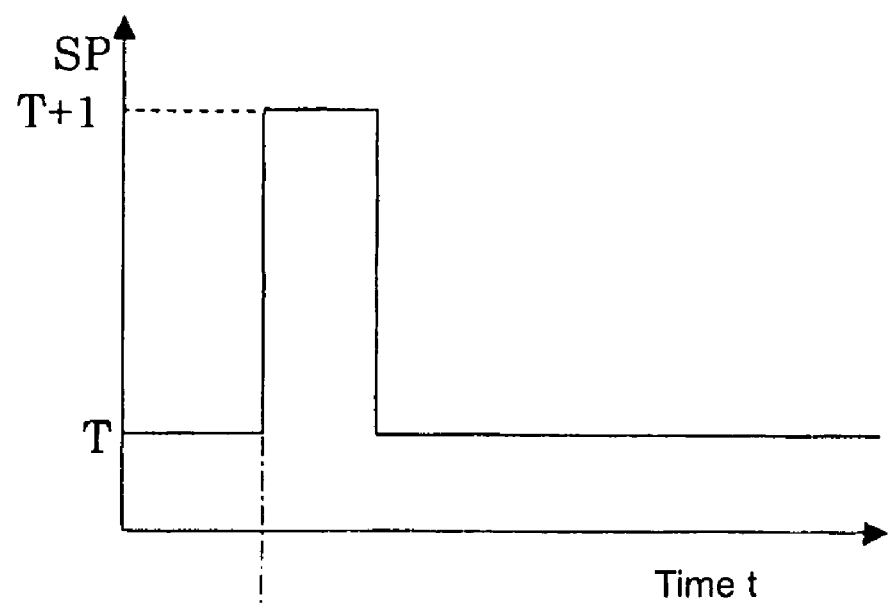
FIG. 5 shows a pulsed input and a pulsed response waveform.

For example, as shown in FIG. 5A, when the target temperature SP is changed by 1° C. from the predetermined temperature T, a pulsed response waveform shown in FIG. 5B at each measure point of the work 1 as an output with respect to the input of the pulsed target temperature can be composed as follows.

FIGS. 6 and 7 show how to compose the pulsed response waveform, in which FIG. 6 shows the input (change) of the target temperature, and FIG. 7 shows the response waveform at each measure point of the work 1 as the output corresponding to the input of the target temperature.

Figure 5B:
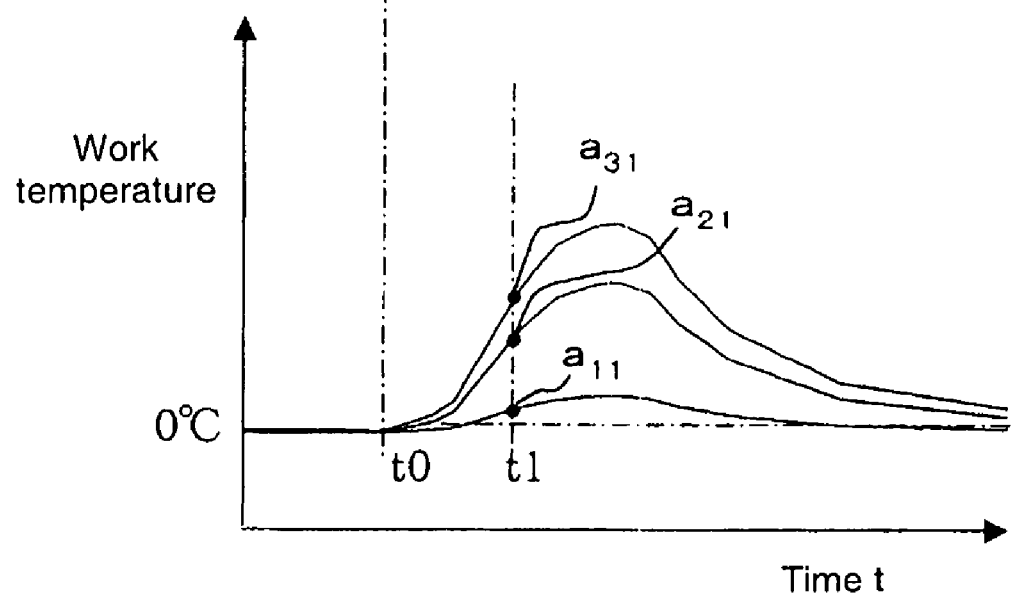
Figure 6A:
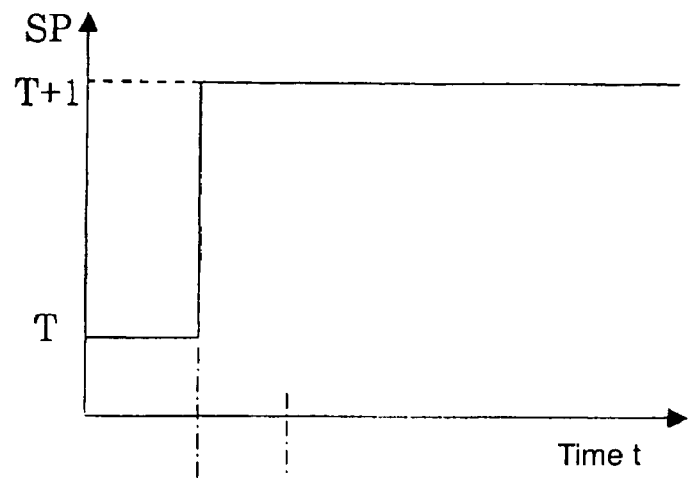
FIG. 6 shows waveform to explain composition of the pulsed input.
Figure 6B:
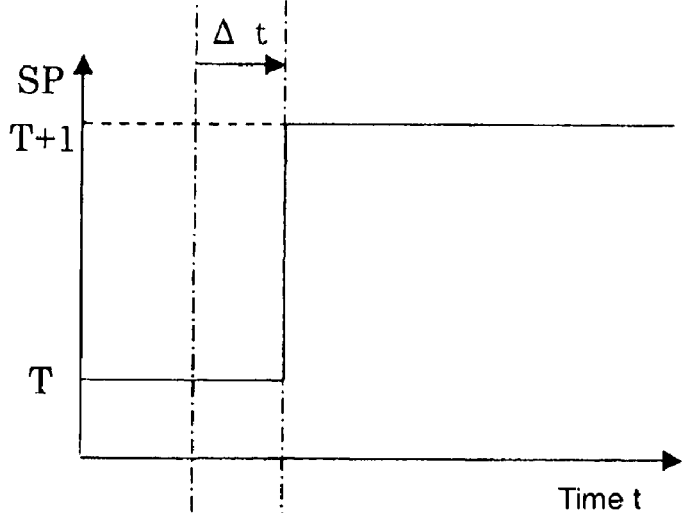
Figure 6C:
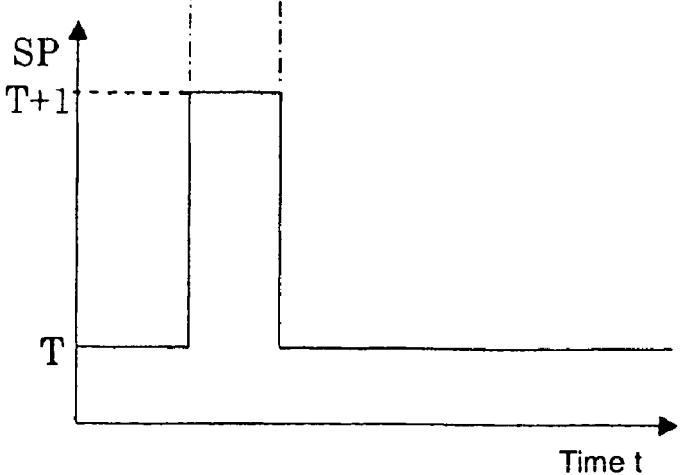
Figure 7A:
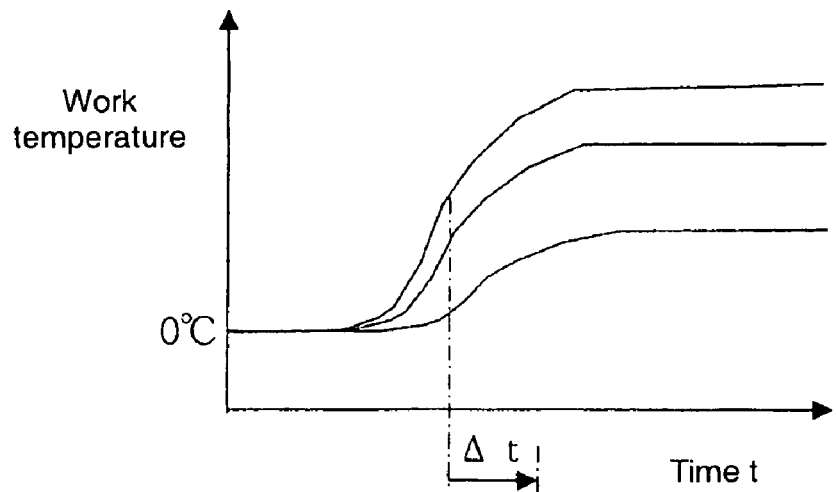
FIG. 7 shows waveform to explain composition of the pulsed response waveform.
Figure 7B:
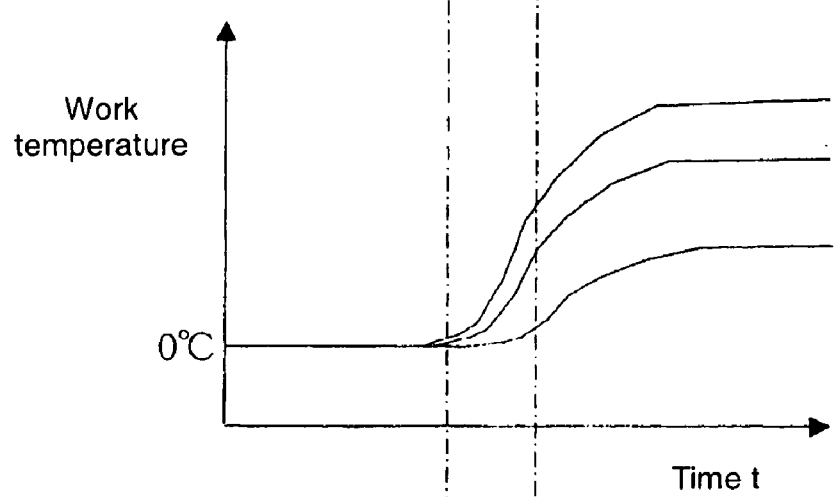
Figure 7C:
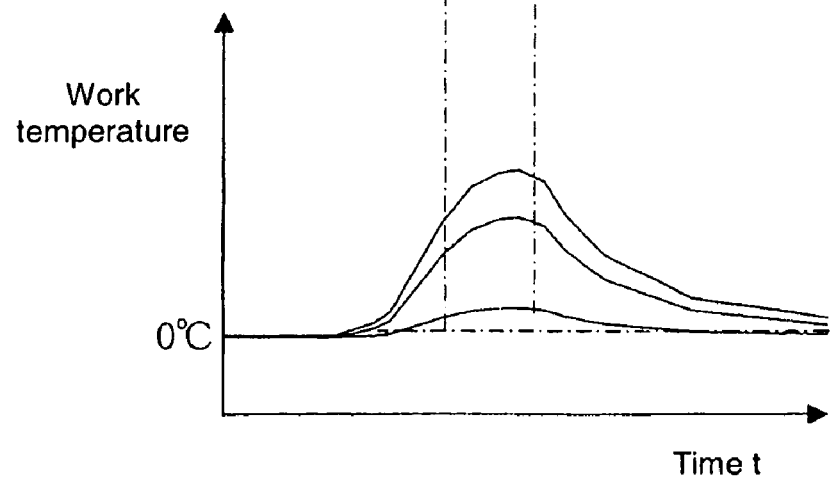

The stepped input of 1° C. and the stepped response waveform as the output shown in FIGS. 6A and 7A are delayed by Δt, 1 second, for example as shown in FIGS. 6B and 7B, respectively. Then, by subtracting the delayed stepped input and the stepped response waveform from the stepped input and the stepped response waveform before delayed shown in FIGS. 6A and 7A, the pulsed input by 1° C. for 1 second and the pulsed response waveform that is the output of this input are calculated as shown in FIGS. 6C and 7C. FIGS. 6C and 7C are the same waveforms as those shown in FIGS. 1A and 5B.

Thus, by measuring the stepped response waveform shown in FIG. 4B with respect to the stepped input of the target temperature shown in FIG. 4A, the pulsed response waveform shown in FIG. 5B with respect to the pulsed input of the target temperature shown in FIG. 5A can be composed through the calculation.

In addition, the above delay time Δt is appropriately selected so that a required temperature change of the stepped response waveform can be provided.

When the pulsed response waveform is composed with respect to each channel, the pulsed response waveforms at the plurality of measure points in the work 1 with respect to the pulsed changes in target temperature can be found.

From this pulsed response waveforms, the interference matrix showing the influence of the temperatures in the plurality of measure points in the work 1 with respect to the changes in target temperature can be provided.

Figures 8, 9:
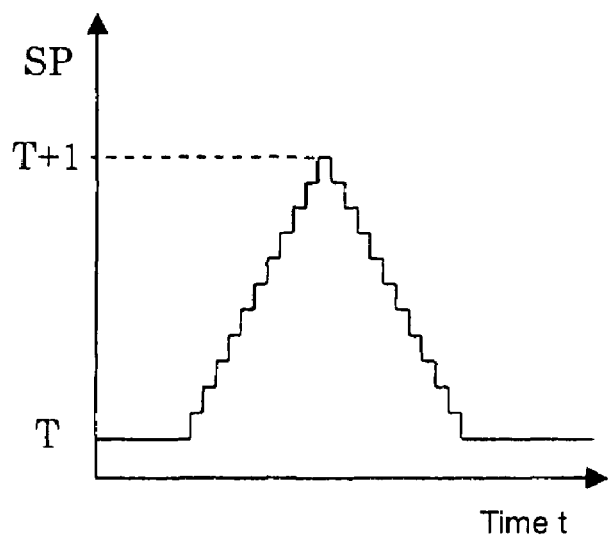
FIG. 8 shows an example of an interference matrix.
FIG. 9 shows an input of a triangular waveform.

FIG. 8 shows an example of the interference matrix, in which each row corresponds to each of the plurality of measure points 1 to k (k is a integer of 2 or more) of the work 1 and each column corresponds to each of the channels ch1 to chp (p is an integer of 2 or more).

FIG. 8 shows one example of the interference matrix which is found from the pulsed response waveforms shown in FIG. 5B at the measure points in the work 1 at a predetermined elapsed point t1 (=t) from a reference point t0 (=t) when the target temperature is changed into the form of a pulse by 1° C. for 1 second as shown in FIG. 5A. The predetermined elapsed point t1 is selected so as to correspond to a time to prevent the variation in temperature of the work 1 while the reference time t0 in which the target temperature is changed is set to a starting point of the heat treatment of the work 1 on the hot plate 2.

For example, in the case where the target temperature of the first channel 1 is changed as shown in FIG. 5A in the form of the pulse, when the first to third measure points 1 to 3 show temperature changes a11, a21 and a31 at elapsed time t1 (=t) as shown in FIG. 5B, these temperature changes a11, a 21 and a31 constitute a part of the interference matrix shown in FIG. 8.

Thus, the interference matrix shown in FIG. 8 can be calculated from the response waveforms at the measure points 1 to k at the elapsed time t1 (=t) while the target temperatures of the channels ch1 to chp are changed in the form of the pulse.

From the interference matrix shown in FIG. 8, the temperature change at each measure point of the work 1 can be predicted. As shown in FIG. 8, for example, when it is assumed that the target temperature of the first channel ch1 is changed by 1° C. for 1 second in the form of the pulse, a temperature is changed by 0.12° C. (a11) at the measure point 1 and a temperature is changed by 0.21° C. (a21) at the measure point 2 in the work 1 at the elapsed time t1 (=t), or when it is assumed that the target temperature of the second channel ch2 is changed by 1° C. for 1 second in the form of the pulse, a temperature is changed by 0.03° C. (a12) at the measure point 1 and a temperature is changed by 0.08° C.(a22) at the measure point 2 in the work 1 at the elapsed time t1 (=t).

Similar to FIG. 8, an interference matrix at a certain elapsed point from the reference point t0 (=t) when the target temperature is changed by 1° C. for 1 second in the form of the pulse can be found from the pulsed response waveforms shown in FIG. 5B. Namely, when the plurality of points to prevent the variation in temperature of the work 1 are previously set, the interference matrix corresponding to those points can be provided.

According to this embodiment, in order to effectively prevent the variation in temperature of the work 1, the following interference matrix is used.

The interference matrix used in this embodiment will be described in detail hereinafter.

Although the interference matrix is found from the response waveforms at the measure points of the work with respect to the change in temperature as described above, abrupt change in target temperature causes saturation of the operation amount and complicates the control in some cases.

Thus, according to this embodiment, the target temperature is not changed in the form of the pulse and the interference matrix is found from the response waveform when the target temperature is changed in the form of almost a triangle.

Figure 10A:
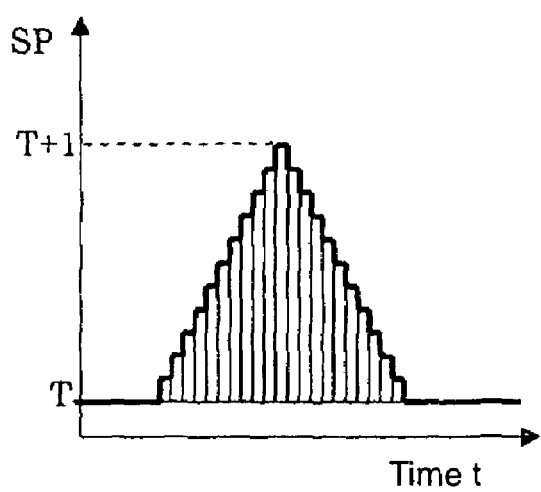
FIG. 10 shows composition of the triangular input shown in FIG. 9 for purposes of illustration.
Figure 10B:
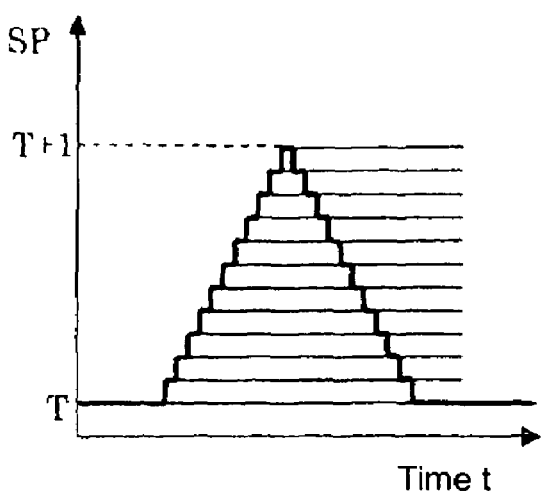

FIG. 10 shows how to compose waveforms of this temperature, in which FIG. 10A uses the pulsed waveform in FIG. 5 and FIG. 10B uses the stepped waveform in FIG. 4.

As shown in FIG. 10A, the waveform in the form of almost a triangle shown in FIG. 9 can be provided by integrating a plurality of pulsed inputs having different height (temperature change) and small time widths. This small pulsed inputs and its pulsed response waveforms can be composed such that the height (temperature change) is provided from a proportional relation and the time width is provided by subtracting the delay time Δt related to the time width in the pulsed input and its response waveform in FIG. 5 similar to FIG. 6.

The fine pulsed input in which a height is 0.1° C. and a time width is 0.1 second and its response waveforms can be composed by multiplying the heights of the pulsed input and pulsed response waveform having the height of 1° C. and the time width of 1 second in FIG. 5 by 0.1 and by subtracting the pulsed input and its pulsed response waveform delayed by 0.1 second from the input and its pulsed response waveform before delayed.

In addition, as shown in FIG. 10B, the waveform in the form of almost a triangle shown in FIG. 9 can be composed such that a plurality of rectangles having a small height (temperature change) and gradually decreasing time widths are laminated. Each rectangle is calculated such that heights of the stepped input and its response waveforms in FIG. 4 are found from a proportional relation and they are delayed so as to correspond to the above time width and this delayed waveform is subtracted from the stepped input and its response waveforms before delayed.

The almost triangular waveform can be composed into a smooth triangular waveform by using a smaller pulse input or stepped input, and it is described as the triangular waveform in the following description and drawings. The height of the triangular waveform is temperature is 1° C., for example similar to the above, and its time width is determined by dividing a period to prevent the variation in temperature of the work 1 shown in FIG. 2 into the plural number. This plural number is determined in view of complication of calculating processes and an effect of variation prevention.

Thus, by calculating the interference matrix from the triangular input of the target temperature and its response waveforms, an interference matrix which can avoid the saturation of the operation amount can be provided.

Figure 11:
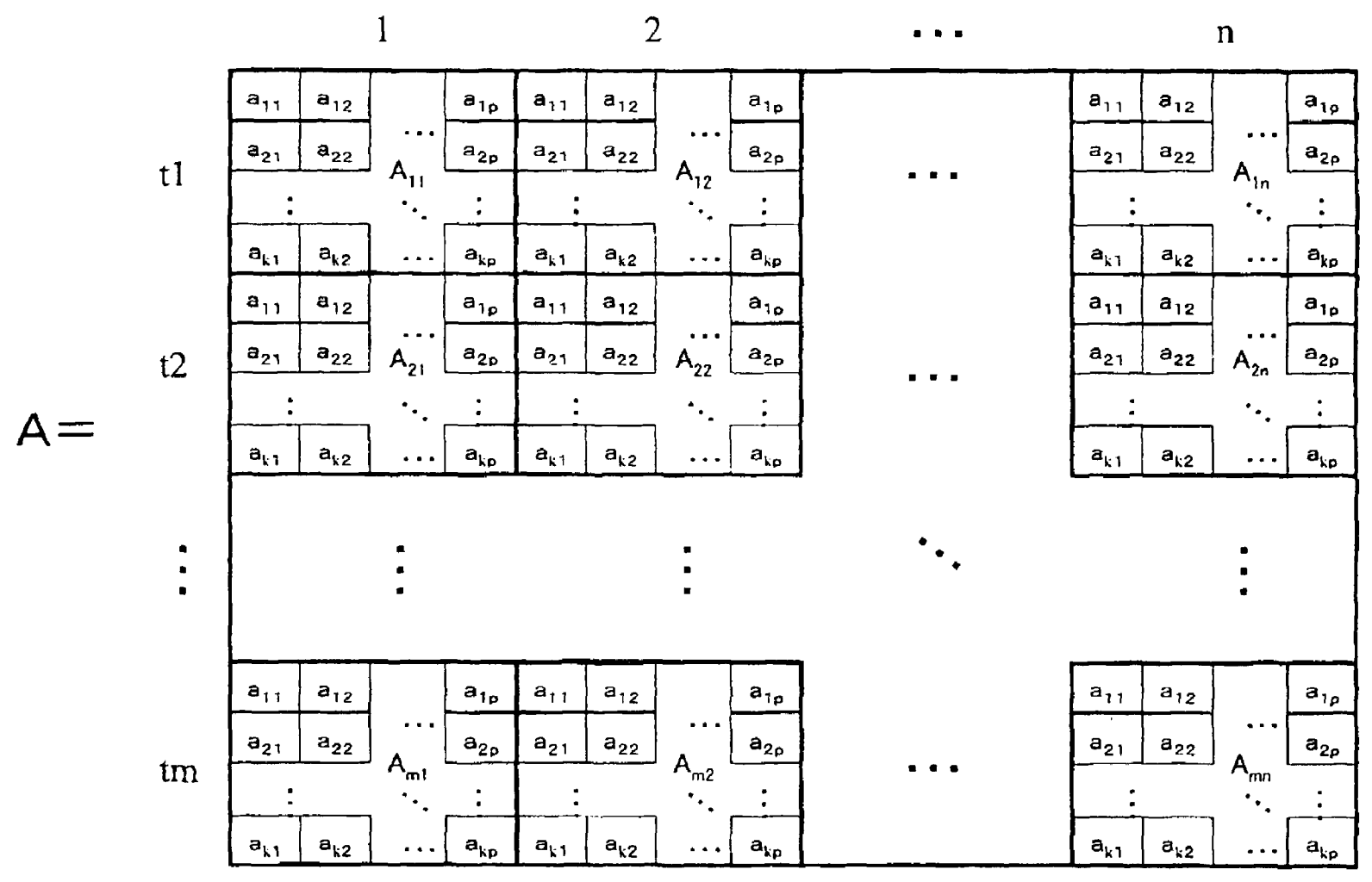

FIG. 11 shows an interference matrix A according to this embodiment, which is provided in view of temporal and special interference in order to prevent the variation in temperature of the work 1 with high precision. In addition, although the temperature changes which are components constituting each of matrixes A11 to Amn are shown by a11 to akp in common in FIG. 11, they show only relations between the measure points 1 to k and the channels ch1 to chp, and it does not mean that concrete values of the temperature changes are the same.

That is, the interference matrix A shown in FIG. 11 is a matrix in view of a relation of the temporal interference shown in FIG. 12, and each matrix in FIG. 12 is a matrix in view of the special (positional) relation shown in FIG. 13, for example and has a double structure in which the matrix contains the matrixes.

First, the matrix provided in view of the temporal relation shown in FIG. 12 will be described.

Figure 14A:
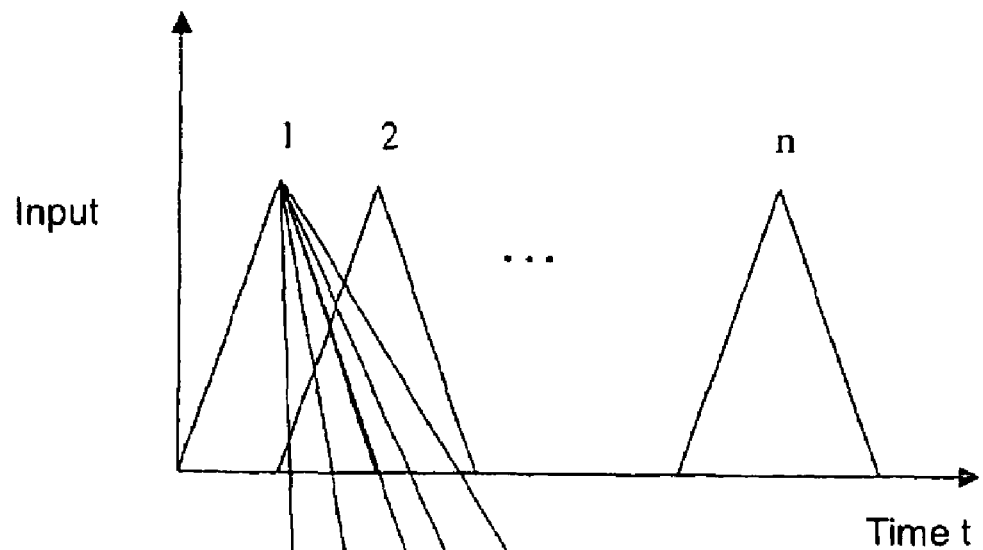
FIG. 14 shows an input of a target temperature and output as its response waveform.
Figure 14B:
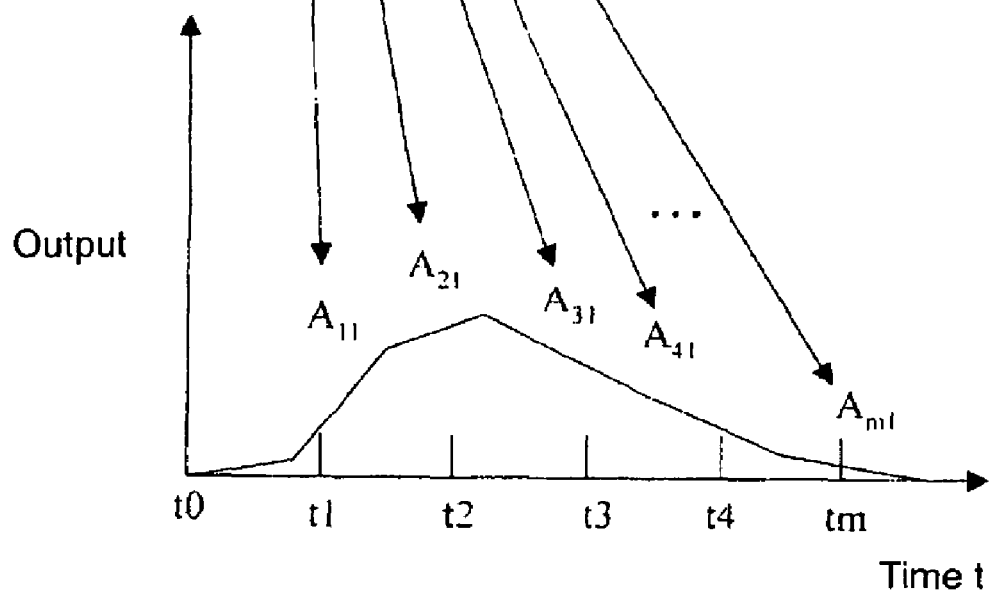

FIG. 14 is a waveform diagram to explain the interference matrix shown in FIG. 12, in which FIG. 14A shows a change of the temperature as an input and FIG. 14B shows its response waveform as an output, for example.

Although the pulsed input of the target temperature of each of the channels ch1 to chp is only provided at the same timing in the interference matrix shown in FIG. 8, this embodiment corresponds to inputs of the target temperatures at a plurality of the first to n-th (n is an integer of 2 or more) timings having regular time differences.

That is, a corresponding matrix is calculated from each response waveform when triangular input is applied to each of the channels ch1 to chp at the first timing, a corresponding matrix is calculated from each response waveform when the triangular input is applied to each of the channels ch1 to chp at the second timing delayed a certain time, and similarly, a corresponding matrix is calculated from each response waveform when the triangular input is applied to each of the channels ch1 to chp at the n-th timing.

At this time, regardless of the first to n-th timings of the inputs of the target temperatures, each of the elapsed points t1 to tm (=t) (m is an integer of 2 or more) in the response waveform shown in FIG. 14 is defined based on the point t0 when the target temperature is inputted at the first timing, that is, when the target temperature of the first timing is changed in the form of triangle. That is, when the timing of the input of the target temperature is delayed, its response waveform is also delayed, but the reference point t0 (=t) and the elapsed points t1 to tm (=t) are not delayed and fixed at the first timing. Thus, the interference matrix is calculated from the response waveform delayed with respect to the fixed elapsed points t1 to tm (=t).

Each row of the interference matrix A shown in FIG. 12 corresponds to each of the elapsed points t1, t2, t3, . . . tm from the reference point t0 (=t) of the input of the target temperature at the first timing in the response waveform in FIG. 14B, respectively. For example, the matrixes A11 to A1*n* on the uppermost first row show the relation at the elapsed point t1 (=t), and matrixes A21 to A2*n* of the next row show the relation at the elapsed point t2 (=t), and similarly, the matrixes Am1 to Amn of the lowermost row shows the relation at the elapsed time tm (=t).

Here, each of the elapsed points t1, t2, t3, . . . tm (=t) is previously determined so as to correspond to each point when the variation is to be prevented while the variation in temperature of the work 1 shown in FIG. 2 is generated. At this time, the reference point t0 (=t) when the target temperature is changed into triangular form at the first timing is to correspond to a point when the heat treatment is started for the work 1 on the hot plate 2.

Each column of the interference matrix A shown in FIG. 12 correspond to the plurality of triangular inputs of the target temperatures having a regular time difference. For example, the matrixes A11 to Am1 of the leftmost column show the relation with respect to the triangular inputs of the target temperatures at the first timing, which correspond to FIG. 14. Furthermore, the matrixes A12 to Am2 of the next column show the relation with respect to the triangular inputs of the target temperatures at the second timing delayed a certain time, and similarly, the matrixes A1n to Amn of the rightmost column show the relation with respect to the triangular inputs of the target temperatures at the last n-th timing.

Here, according to the triangular inputs of the target temperatures shown in FIG. 14A, the triangular waveform at the earlier timing is preferably overlapped with a part of the triangular waveform at the next timing so that at least the change in target temperature may become sequential. According to this embodiment, a time corresponding to ½ of a base of the triangular waveform is delayed. In addition, when the delay time is constant, the calculation process is simple, but the delay time is not necessarily constant.

As described above, according to the interference matrix A shown in FIG. 12, each row corresponds to each of the elapsed points t1, t2, . . . , tm in the triangular response waveform, and each column corresponds to each input of the target temperature having a time difference. Thus, according to the matrix positioned at the intersection between the row and column, for example the matrix A21, the triangular input of the target temperature is at the first timing since it is on the first column and it is at the elapsed point t2 in the triangular response waveform since it is on the second row. Similarly, according to the matrix A12, the triangular input of the target temperature is at the second timing since it is on the second column and it is at the elapsed point t1 in the triangular response waveform since it is in the first row.

Thus, according to the interference matrix A shown in FIG. 12, since each row corresponds to each of the elapsed points t1, t2, . . . , tm in the triangular response waveform, and each column corresponds to each input of the target temperature having a time difference, it is the interference matrix showing the temporal influence of the input of the target temperature and the triangular response waveform.

In addition, there are triangular inputs of the target temperatures of the first to p-th channels ch1 to chp every timing of the first to n-th timing, and there are triangular response waveforms at measure points 1 to k for each input of the target temperature, however, in FIG. 14A, the input of the target temperature of each channel at each timing is representatively shown by one triangular waveform, and in FIG. 14B, a plurality of response waveforms corresponding to each channel and each measure point are representatively shown by one response waveform.

Next, the special (positional) relation of the interference matrix A will be described with reference to FIG. 13.

FIG. 13 representatively shows the matrix A 21 in the interference matrix A in FIG. 12.

As described above, since the matrix A21 is positioned on the first column and second row of the interference matrix A, the triangular input of the target temperature is at the first timing and corresponds to the elapsed point t2 of the triangular response waveform.

As shown in FIG. 13, according to the matrix A21, each column corresponds to each of the first to p-th channels ch1 to chp, and each row corresponds to each of the first to k-th measure points s1 to sk.

Figure 15A:
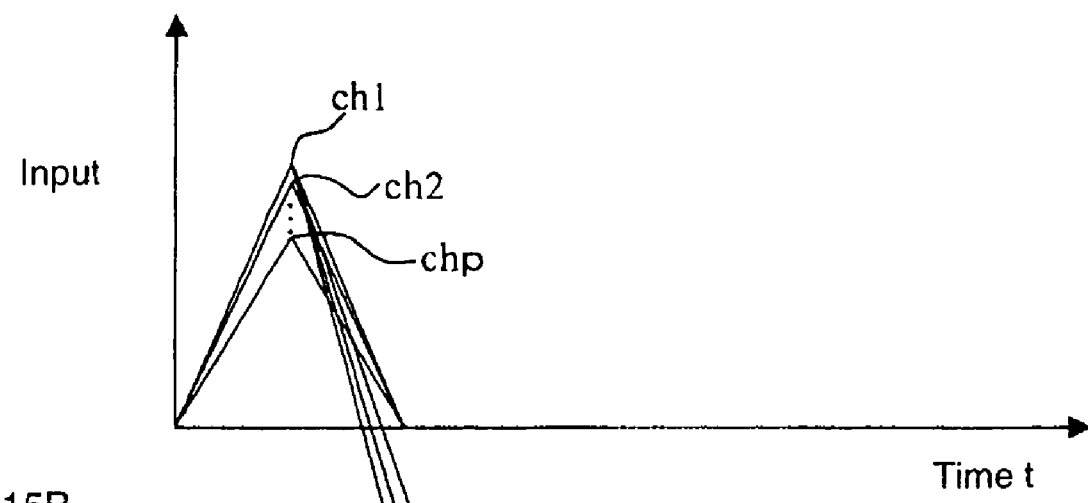
FIG. 15 shows an input of a target temperature and output as its response waveform.
Figure 15B:
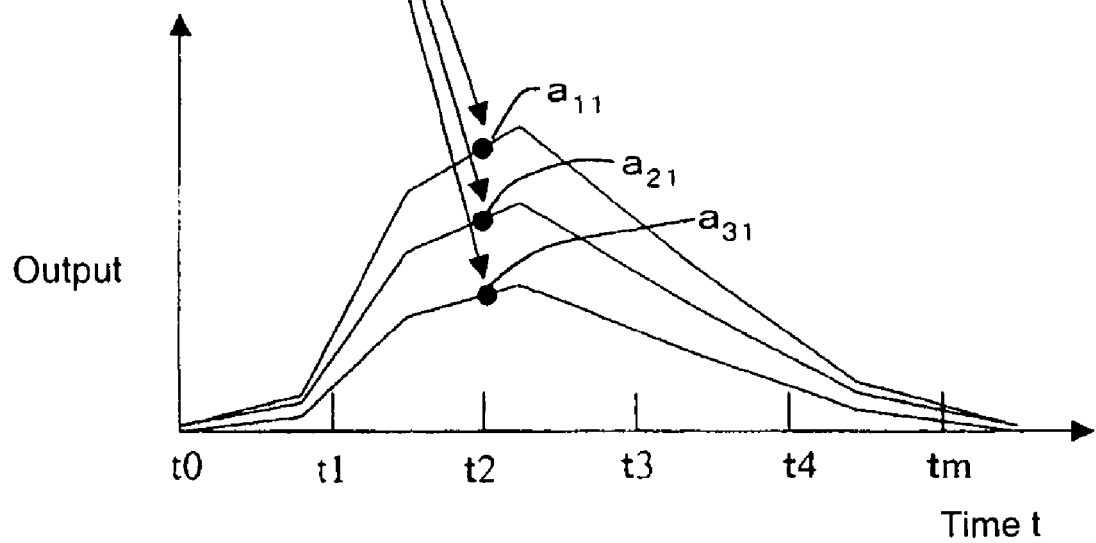

For example, the temperature change "a11" on the leftmost first column and the uppermost first row is the temperature change at the elapsed point t2 at the first measure point s1 in the triangular response waveform shown in FIG. 15B with respect to the triangular input of the target temperature at the first ch1 at the first timing as shown in FIG. 15A, and the temperature change "a21" on the first column and second row is the temperature change at the elapsed point t2 at the second measure point s2 in the triangular response waveform with respect to the triangular input of the target temperature at the first ch1. Similarly, the temperature change "ak1" on the first column and lowermost row is the temperature change at the elapsed point t2 at the k-th measure point sk in the triangular response waveform with respect to the triangular input of the target temperature at the first channel. In addition, three triangular response waveforms of the measure point s1 to s3 are representatively shown in FIG. 15B and the inputs of the temperatures at the first timing are shown in FIG. 15A. Although triangular waveforms of the channels except for the first channel ch1 are low so that they can be easily recognized, the triangular waveform at each channel has the same height actually.

In addition, the temperature change "a12" in the second column and first row is the temperature change at the elapsed point t2 in the triangular response waveform at the first measure point s1 with respect to the triangular input of the target temperature at the second channel ch2. Furthermore, the temperature change "a22" in the second column and second row is the temperature change at the elapsed point t2 in the triangular response waveform at the second measure point s2 with respect to the triangular input of the target temperature at the second channel ch2. Similarly, the temperature change "ak2" on the second column and lowermost row is the temperature change at the elapsed point t2 in the triangular response waveform at the k-th measure point sk with respect to the triangular input of the target temperature at the second channel ch2.

Similarly, the temperature change "a1p" on the rightmost column "p" and first row is the temperature change at the elapsed point t2 in the triangular response waveform at the first measure point s1 with respect to the triangular input of the target temperature at the p-th channel chp. The temperature change "a2p" on the column "p" and second row is the temperature change at the elapsed point t2 in the triangular response waveform at the second measure point s2 with respect to the triangular input of the target temperature at the p-th channel chp. Similarly, the temperature change "akp" on the "p" column and lowermost row is the temperature change at the elapsed point t2 in the triangular response waveform at the k-th measure point sk with respect to the triangular input of the target temperature at the p-th channel chp.

Thus, since each row corresponds to each of the measure points s1 to sk in the response waveform and each column corresponds to each of the channels ch1 to chp in the matrix A21, it is the interference matrix showing an influence of the special position such as the position in the work 1 and arrangement of the heaters and the temperature sensors corresponding to the channels ch1 to chp. This is not limited to the matrix A21 and applied to the matrix constituting the interference matrix shown in FIG. 12.

Therefore, the interference matrix A shown in FIG. 12 and in detail in FIG. 11 is the matrix provided in view of the temporal and special influences.

The interference matrix A used in this embodiment has been described above, and the personal computer shown in FIG. 3 calculates the interference matrix A by the calculation operation from the stepped response waveform measured as described above and stores it in a file for the interference matrix, for example.

Furthermore, the personal computer 4 measures data of the measured temperature at the plurality of measure points 1 to k of the work 1 when the heat treatment shown in FIG. 2 is performed using the test work 1, and stores it in a data file. That is, in a state before the target temperature is adjusted according to this embodiment, the temperatures at the plurality of measure points 1 to k of the work 1 are measured when the heat treatment of the work 1 is performed and stored in the data file.

The personal computer 4 calculates the adjustment value as the adjustment information to adjust the target temperature to prevent the variation, based on the interference matrix A and the measured data of the temperatures at the plurality of measure points 1 to k of the work 1 as follows.

Here, when it is assumed that the triangular temperature change of the target temperature (height of the triangular waveform) of the channels ch1 to chp at the first to the n-th timings are c1 to cn, and the temperature change at the measure points 1 to k at the elapsed points t1 to tm of the work 1 are b1 to bm, the temperature change b1 to bm at the measure points 1 to k at the elapsed points t1 to tm of the work 1 can be shown by the following formula with the interference matrix A.

[Formula]

$$\begin{bmatrix} b_1 \\ b_2 \\ \vdots \\ b_m \end{bmatrix} = \begin{bmatrix} A_{11} & A_{12} & \cdots & A_{1n} \\ A_{21} & A_{22} & \cdots & A_{2n} \\ \vdots & \vdots & & \vdots \\ A_{m1} & A_{m2} & \cdots & A_{mn} \end{bmatrix} \begin{bmatrix} C_1 \\ C_2 \\ \vdots \\ C_n \end{bmatrix} \quad (1)$$

In the above formula, b1 designates a vector showing a temperature change at each of the measure points 1 to k at the elapsed point t1 (=t), b2 designates a vector showing a temperature change at each of the measure points 1 to k at the elapsed point t2 (=t), and similarly, bm designates a vector showing a temperature change at each of the measure points 1 to k at the elapsed point tm (=t).

In addition, c1 designates a vector showing a triangular temperature change of the target temperature (height of the temperature) at each of the channels ch1 to chp at the first timing, c2 designates a vector showing a triangular temperature change of the target temperature (height of the temperature) at each of the channels ch1 to chp at the second timing, and similarly, cn designates a vector showing a temperature change of the target temperature of the temperature (height of the temperature) at each of the channels ch1 to chp at the n-th timing.

This formula (1) shows the temperature changes b1 to bm of each of the measure points 1 to k of the work 1 at each of the elapsed points t1 to tm with respect to the temperature changes c1 to cn of the target temperatures at each of the first to n-th timings.

That is, according to the formula (1), when the height of the triangle of the temperature of the target temperature at each of the first to the n-th timings are c1 to cn, the temperature change at the measure point of the work 1 at each of the elapsed points t1 to tm (=t) are b1 to bm.

Therefore, reversely, when the temperature changes b1 to bm at the measure point of the work 1 at the elapsed points t1 to tm (=t) are selected so as to prevent the variation, the temperature change of the target temperature required to generate such temperature change (height of the temperature) c1 to cn, that is, the adjustment values c1 to cn can be calculated by the following formula using an inverse matrix $A^{-1}$ of the interference matrix A.

[Formula 2]

$$\begin{bmatrix} C_1 \\ C_2 \\ \vdots \\ C_n \end{bmatrix} = \begin{bmatrix} A_{11} & A_{12} & \cdots & A_{1n} \\ A_{21} & A_{22} & \cdots & A_{2n} \\ \vdots & \vdots & & \vdots \\ A_{m1} & A_{m2} & \cdots & A_{mn} \end{bmatrix}^{-1} \begin{bmatrix} b_1 \\ b_2 \\ \vdots \\ b_m \end{bmatrix} \quad (2)$$

When the inverse matrix $A^{-1}$ of the interference matrix A can be found, the adjustment values c1 to cn of the target temperature can be calculated by the formula (2). However, since the number of the measure points 1 to k of the work 1 is greater than the number of channels ch1 to chp which can be controlled in general, it is difficult to find the inverse matrix $A^{-1}$. Therefore, according to this embodiment, instead of the inverse matrix $A^{-1}$, a pseudo-inverse matrix $(A^T*A)^{-1}*A^T$ is used. In addition, $A^T$ is a transposed matrix of the interference matrix A.

The personal computer 4 calculates a temperature change that can prevent the variation from the data of the measured temperatures at the plurality of measure points 1 to k of the work 1 when the heat treatment shown in FIG. 2 is performed, as temperature distribution information.

For example, referring to FIG. 2, when the measured temperature b11 at the measure point 1 at the elapsed point t1 (=t) is higher than the average value by 0.08° C., −0.08° C. is provided to prevent the variation as the temperature distribution information at the measure point 1 at the elapsed point t1 (=t), and when the measured temperature b21 at the measure point 2 at the elapsed point t1 (=t) is lower than the average value by 0.04° C., +0.04° C. is provided to prevent the variation as the temperature distribution information at the measure point 2 at the elapsed point t1 (=t), and when the measured temperature b31 at the measure point 3 at the elapsed point t1 (=t) is lower than the average value by 0.08° C., +0.08° C. is provided to prevent the variation as the temperature distribution information at the measure point 3 at the elapsed point t1 (=t). Similarly, the temperature distribution information until the measure point k at the elapsed point t1 (=t) is calculated. Furthermore, similarly, the temperature distribution information of the measure points 1 to k at the elapsed points t2 to tm is calculated.

The calculated temperature distribution information at the elapsed points t1 to tm (=t) to prevent the variation in temperature is used as the b1 to bm in the above formula (2).

The personal computer 4 calculates the adjustment values c1 to cn of the target temperature from the extracted temperature distribution information b1 to bm and the pseudo-inverse matrix $(A^T*A)^{-1}*A^T$ used instead of the inverse $A^{-1}$ of the interference matrix A according to the formula (2).

The adjustment values c1 to cn are vectors of plus or minus temperature values with respect to the predetermined temperature T that is the target temperature to perform the heat treatment of the work 1 by the hot plate 2, and when these adjustment values c1 to cn (referred to as the "c" hereinafter) are added to the target temperature as addition values of the target temperature, the target temperature can be adjusted.

Since this adjustment value c is calculated using not the inverse matrix $A^{-1}$ of the interference matrix A, but using the pseudo-inverse matrix $(A^T*A)^{-1}*A^T$ that is based on the interference matrix A, an error is generated. However, when it is determined that a preventing effect of the variation in temperature can be sufficiently provided by the calculated adjustment value c, the adjustment value c may be used.

According to this embodiment, the calculated adjustment value c is set to an initial value and an initial group is formed with it and an initial value of the adjustment value randomly generated, and an optimal value of the adjustment value c is searched by a genetic algorithm using an evaluation formula including the interference matrix A in order to further enhance the preventing effect of the variation in temperature.

Here, the following formula is used as the evaluation formula.

$$b' = b - Ac$$

In the above formula, A designates the above interference matrix, c is the adjustment value, and b is the vector of the temperature distribution information calculated to prevent the variation in temperature, which corresponds to the above b1 to bm.

As shown in the above formula (1), when the adjustment value c can be calculated using the inverse matrix $A^{-1}$, b is equal to Ac and the evaluation value b' becomes 0, but according to this embodiment, the adjustment value c is calculated using the pseudo-inverse matrix $(A^T*A)^{-1}*A^T$, instead of the inverse matrix $A^{-1}$, the evaluation value b' does not become 0.

Thus, according to this embodiment, the adjustment value c that has a small variation width, that is, minimum difference between a maximum value and a minimum value of the evaluation value b' is searched and determined as a final adjustment value c.

More specifically, as the initial value, the initial group of 100 adjustment values, for example comprising the adjustment value c calculated using the pseudo-inverse matrix as described above and the randomly generated adjustment values are prepared, the adjustment value b' is calculated by the above evaluation formula for each adjustment value, a first process in which a maximum variation width that is the difference between the maximum value and the minimum value of the evaluation value b' is calculated is performed, a second process in which an adjustment value is selected around the value having the small variation width and favorable value is performed, a third process in which the number of the adjustment value is increased to 100 by generating crossing and mutation in the selected adjustment values, and those first, second and third processes are similarly repeated as one generation, and when the variation width of the evaluation value b' calculated in the first process becomes close to 0, the process is stopped and the adjustment value c having a variation width of the smallest difference in the generation is selected as the final adjustment value c.

The personal computer 4 transmits the adjustment value c of the target temperature searched as described above to the temperature controller 3 through the network.

Figure 16:
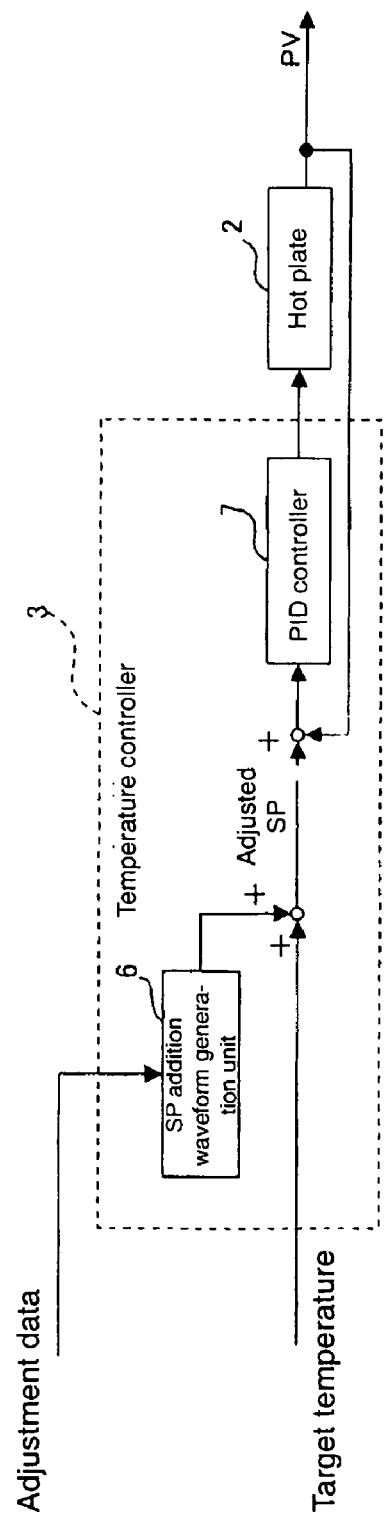
FIG. 16 shows block diagram of a temperature controller.

FIG. 16 shows a block diagram of an inner constitution of the temperature controller 3 that comprises an SP addition waveform generation unit 6 for generating an addition waveform added to the target temperature SP of the predetermined temperature T based on the adjustment data containing the adjustment value c transmitted from the personal computer 4, and a PID controller 7 for performing a PID calculation and outputting the operation amount according to the deviation between the adjusted target temperature to which the addition waveform is added and the detected temperature PV from the hot plate 2. The SP addition waveform generation unit 6 and the PID controller 7 are constituted by a microcomputer.

Figure 17:
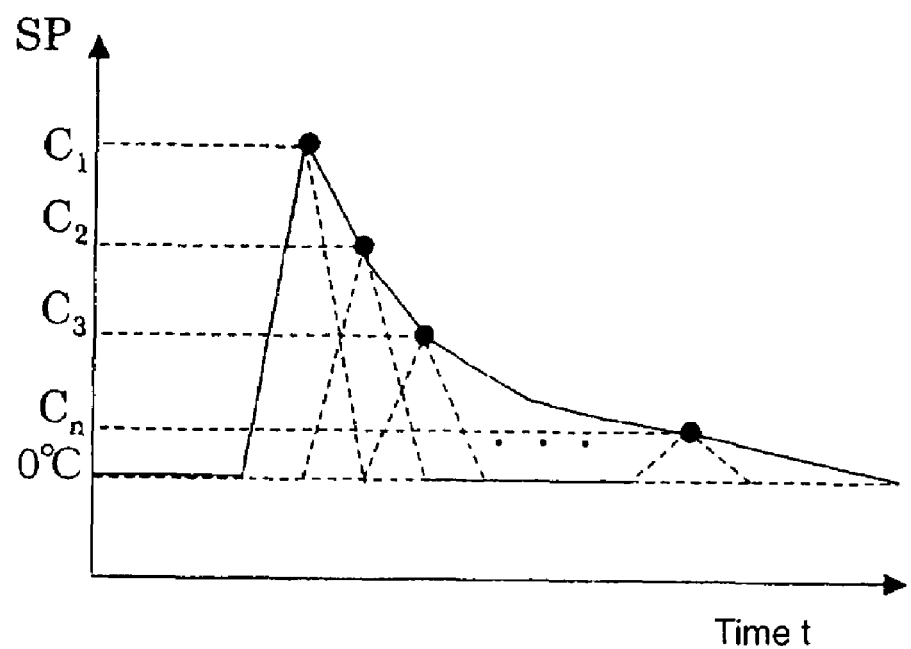
FIG. 17 shows an example of an addition waveform of the target temperature.

FIG. 17 shows an example of the addition waveform of one channel, the adjustment value c (c1 to cn) corresponding to the height of the triangular waveform at the first to the n-th timings is transmitted from the personal computer 4 to the SP addition waveform generation unit 6 so as to be related to each channel. The SP addition waveform generation unit 6 generates the addition waveform connecting apexes of the triangular waveform. At this time, a start point of generation of the SP addition waveform is the start point of the heat treatment of the work 1 on the hot plate 2, for example and it corresponds to the above reference point t0 (=t). A point when the work 1 is mounted on the hot plate 2 can be detected by a timing signal (not shown) from a high-level device for controlling a loading device for loading the hot plate 2 with the work 1 or a change in detected temperature of the hot plate 2, for example.

According to the normal heat treatment process of the work 1, the temperature controller 3 adds the addition waveform to the target temperature SP set to the predetermined temperature T to provide an inner target temperature, and controls the detected temperature PV of the hot plate 2 so that it confirms with the inner target temperature.

Figure 18:
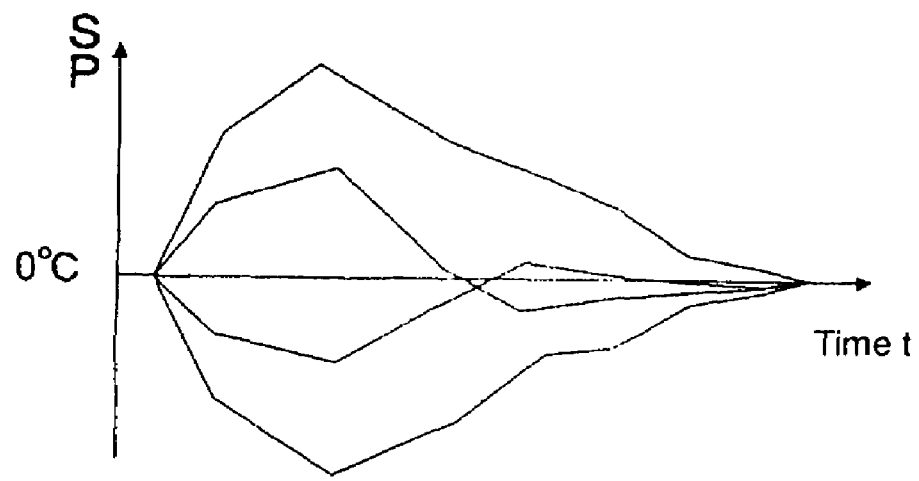
FIG. 18 shows an addition waveform of the target temperature of each channel.
Figure 19:
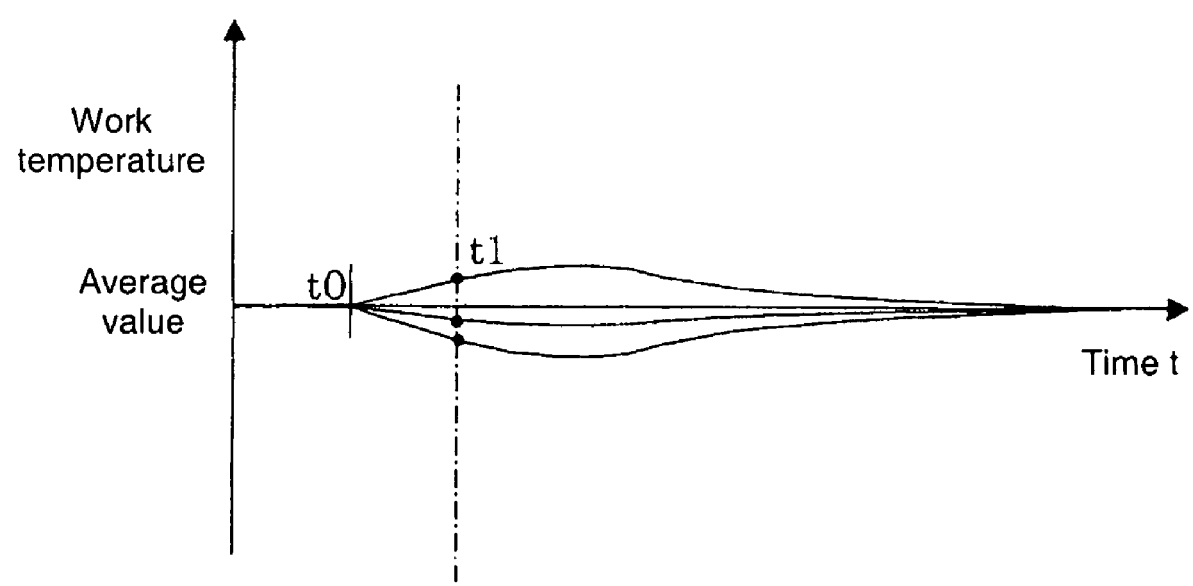
FIG. 19 shows a measured temperature of each measure point of the work in which the variation is prevented.

Therefore, when the addition waveform shown in FIG. 18 is added to the target temperature of each channel and the target temperature is adjusted, the variation in temperature of the work 1 shown in FIG. 2 becomes as shown in FIG. 19, for example, so that uniform heat treatment can be performed.

Figure 20:
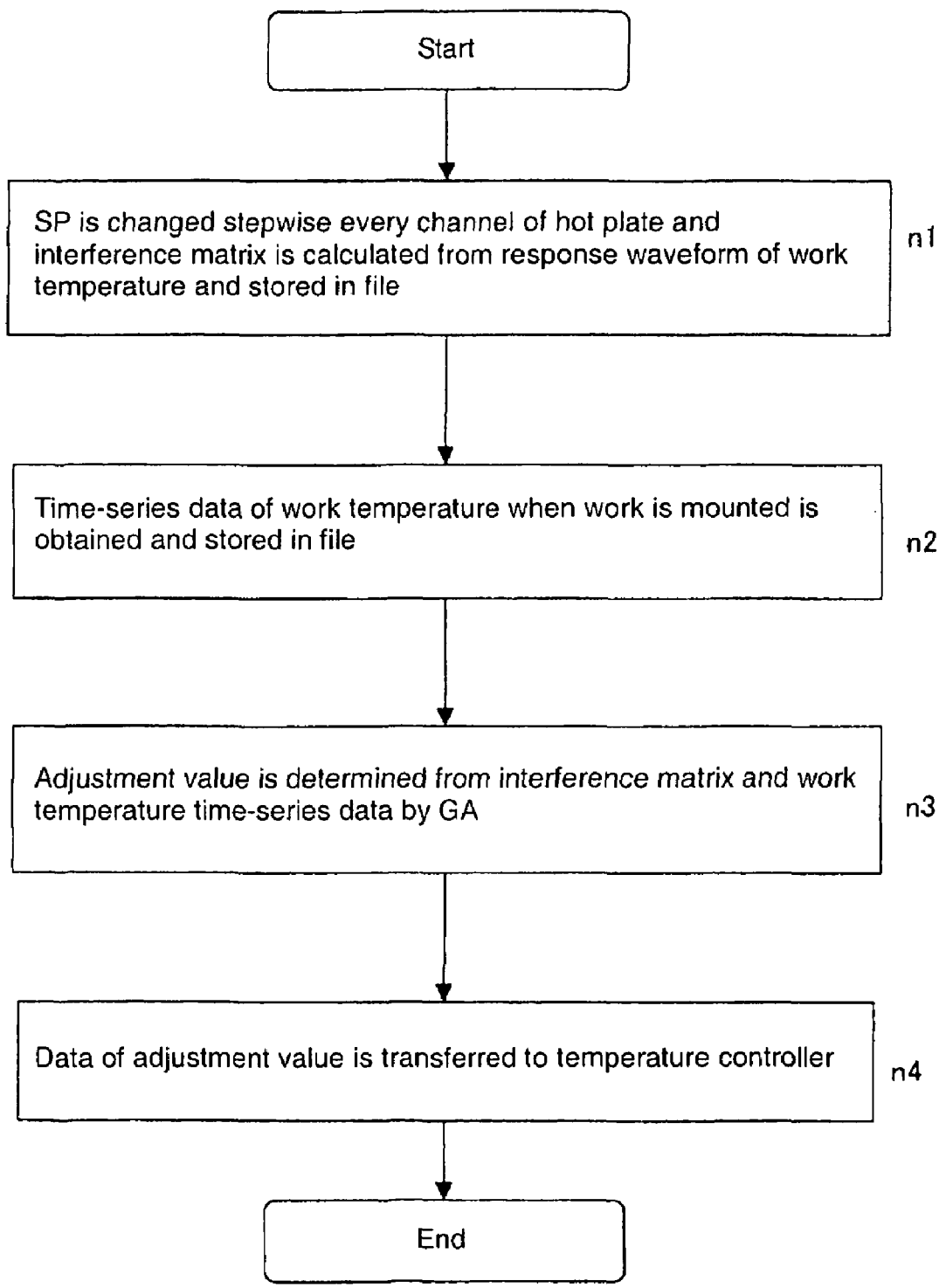
FIG. 20 shows a flowchart for explanation of an operation.

FIG. 20 shows a flowchart of an entire process of the personal computer 4.

First, a response waveform is measured at each of the measure points 1 to k of the work while the target temperature is changed stepwise with respect to each of the channels ch1 to chp of the hot plate 2 and the interference matrix A is calculated from the response waveforms by the calculating operation (first step) and stored in the file at step n1.

Time-series data of the measured temperatures at the measure points 1 to k of the work 1 when the work 1 is mounted on the hot plate 2 that is stabilized at the target temperature and the heat treatment is performed is obtained at step n2.

The adjustment value of the target temperature is calculated from the temperature distribution information to prevent the variation in temperature, extracted from the interference matrix and the time-series data (second step) and the optimal adjustment value is determined using the genetic algorithm GA) at step n3.

The data of the determined adjustment value is transferred to the temperature controller 3 at step n4.

When the normal heat treatment of the work 1 is started, the temperature controller 3 adjusts the target temperature according to the transferred adjustment value to control the temperature.

In addition, in a case where the points t0 to tm (=t) to prevent the variation in temperature of an object to be processed are to be changed, when the points t to tm to be changed is set and inputted to the personal computer 4, the corresponding interference matrix A at that point is calculated and the temperature distribution information is calculated and the adjustment value is calculated based on them.

Embodiment 2

Next, another embodiment of the present invention will be described. According to this embodiment, in order to further effectively prevent the variation in temperature in an early stage of the heat treatment of the work 1 on the hot plate 2, an interference matrix corresponding to an assumption such that the hot plate 2 is preheated up to a temperature higher than the predetermined temperature T by 1° C., for example is found as follows, and the matrixes A11 to Am1 corresponding to the interference matrix A at the first timing shown in FIG. 12 are replaced with the found matrix.

First, the target temperature SP of all of the channels ch1 to chp of the hot plate 2 is set to the predetermined temperature T for the heat treatment and the temperature control is started, and when in a state the temperature of the hot plate 2 reaches the predetermined temperature T and stabilized, the temperatures at the plurality of measure points 1 to k of the test work are measured.

Then, the target temperature SP of the first channel ch1 is set to a temperature that is higher than the predetermined temperature T for the heat treatment by 1° C. and the temperature control is started and in a state the temperature of the hot plate 2 reaches and stabilized at the set temperature T+1° C., the temperatures at the plurality of measure points 1 to k of the test work 1 are measured.

Figure 21A:
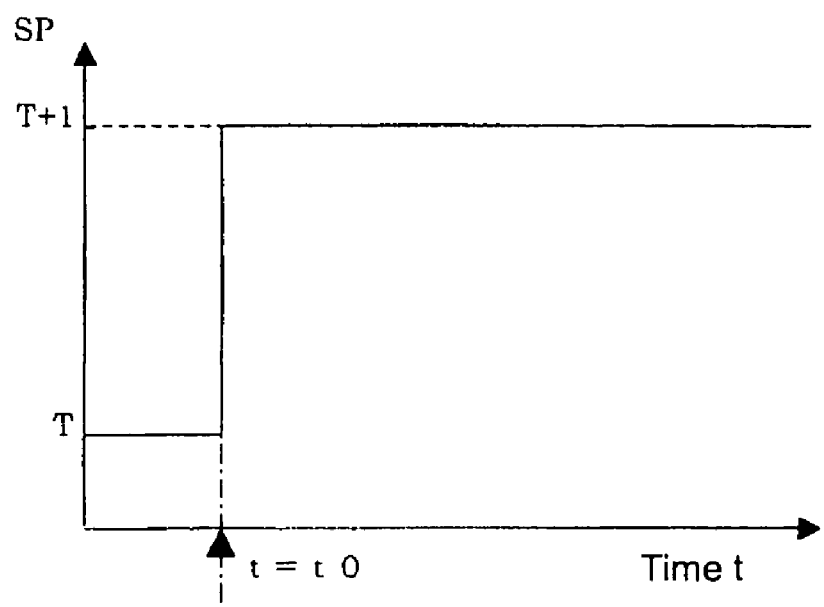
FIG. 21 shows a stepped input assuming preheating and its response waveform.
Figure 21B:
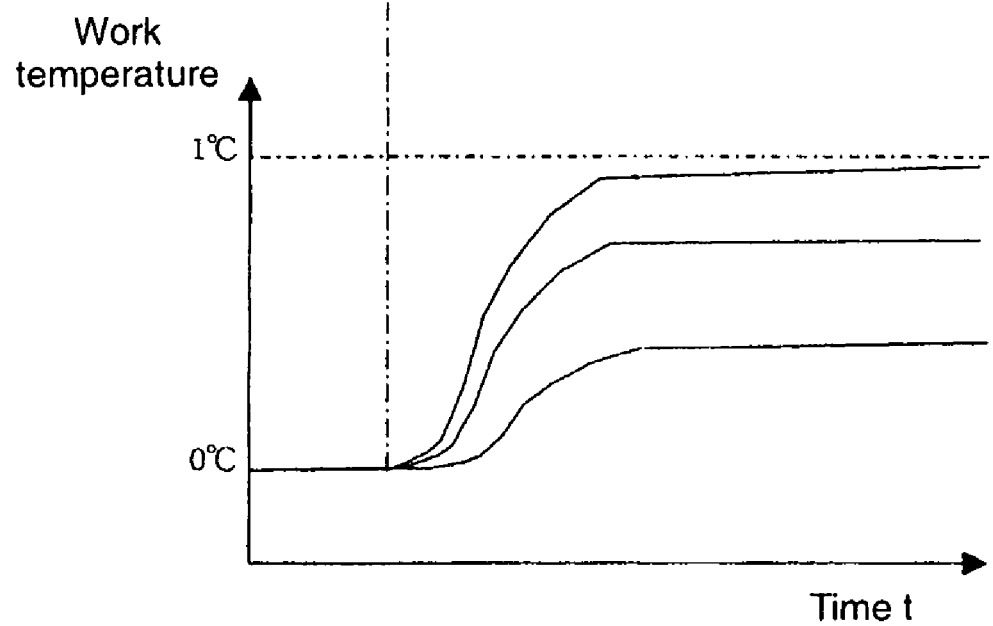

Then, by subtracting the response waveform at the predetermined temperature T from the response waveform at the temperature higher than the predetermined temperature T by 1° C., it is regarded such that the target temperature is changed by 1° C. stepwise at the moment to (=t), and as shown in FIG. 21, a stepped response waveform corresponding to preheating of 1° C. can be provided.

The stepped response waveform corresponding to preheating of 1° C. is measured similarly with respect to each channel.

Figure 22A:
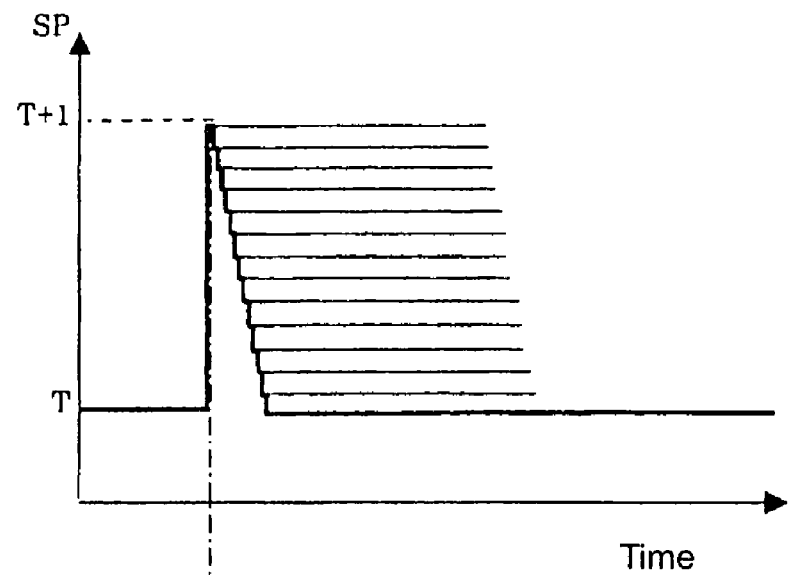
FIG. 22 shows an input corresponding to preheating and its response waveform.
Figure 22B:
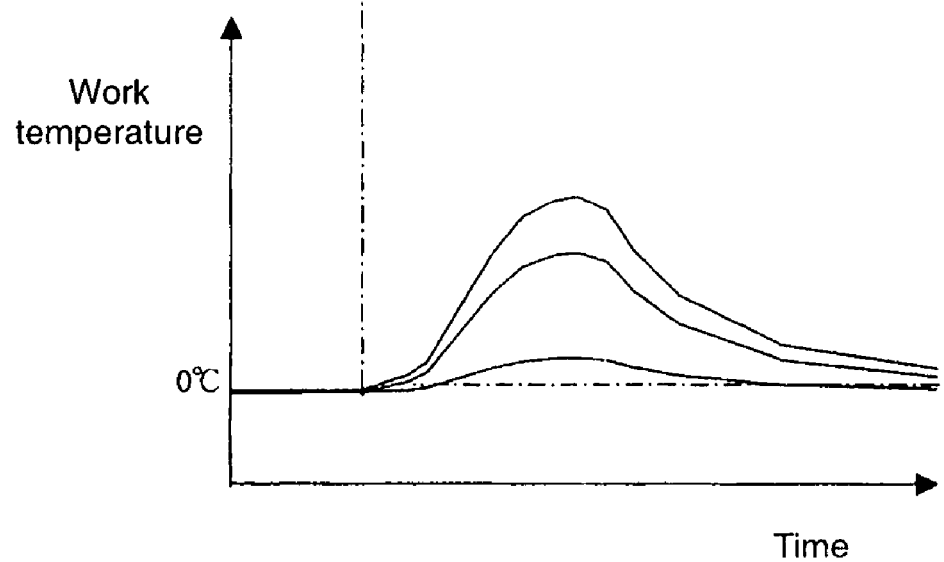

Then, by subtracting the fine stepped response waveform from the above stepped response waveform as shown in FIG. 22A similar to the above FIG. 10B, a response waveform corresponding to the change of the target temperature having a configuration of almost a right triangle can be composed.

The above is performed for each of the channels ch2 to chp and matrixes showing the temperature changes at the measure points 1 to k at the elapsed point t1 to tm (=t) for the channels ch1 to chp can be found similar to the above, the matrixes A11 to Am1 corresponding to the above interference matrix A at the first timing are replaced with those.

According to this embodiment, since the matrixes is provided in view of the change in target temperature corresponding to a case where the work 1 is preheated 1° C. before it is mounted on the hot plate 2, adjustment can be implemented with higher precision in an early stage of the heat treatment of the work 1 on the hot plate 2.

Another Embodiment

Although the personal computer 4 calculates the temperature distribution information b1 to bm to prevent the variation in temperature based on the measured data showing the variation in temperature of the work 1 in the above embodiment, as another embodiment of the present invention, a user may set the temperature distribution information to prevent the variation as a set value from the previously measured data, for example, and in this case, the adjustment value is calculated based on the set value and the above interference matrix A.

Although the interference matrix A is found using the triangular input of the target temperature and its response waveform in the above embodiment, when the saturation does not matter, the interference matrix may be found using the pulsed input of the target temperature and its response waveform.

Although the target temperature is adjusted in the above embodiment, as another embodiment, the target temperature may be substantially adjusted by correcting the detected temperature from the hot plate 2 using the adjustment value.

When the target temperature is adjusted, since the operation amount from the PID controller 7 shown in FIG. 16 can be adjusted, the operation amount may be adjusted instead of the target temperature as another embodiment of the present invention.

More specifically, instead of the target temperature, an interference matrix showing a relation between the operation amount and the temperature of the work 1 is found and an adjustment value of the operation amount required to prevent the variation in temperature is calculated using this interference matrix and the operation amount may be adjusted using this adjustment value.

Although the personal computer 4 transmits the data of the addition value corresponding to the first to the n-th timings with respect to each of the channels ch1 to chp, to the temperature controller 3 in the above embodiment, as another embodiment, the personal computer 4 may compose waveform data of the addition value and send it to the temperature controller 3 as time-series data of the addition value.

Furthermore, in order to reduce a data amount transmitted to the temperature controller 3, a factor value of a transfer function corresponding to the waveform of the addition value may be transmitted to the temperature controller 3 and the temperature controller 3 may regenerate the waveform of the addition value using the transfer function, for example.

For example, the waveform of the addition value can be regarded as an impulse response for the following reason. That is, since a waveform of the addition value $\Delta SP$ of the target temperature SP is a waveform that compensates transitional disturbance, when t=0, $\Delta SP(t)$=0 and when t=∞, $\Delta SP(t)$=0, that is, both ends are 0. In addition, it is swollen in size between them.

Meanwhile, in the case of the impulse response g(t), in the impulse response g(t) also, when t=0, g(t)=0 and when t=∞, g(t)=0, that is, both ends are 0, and it is swollen in size between them.

Therefore, when it is not necessary to conform the fine waveform at a subtle part of the waveform change in the middle to each other, that is, when required precision is satisfied, the addition value $\Delta SP$ of the SP may be regarded as the impulse response.

Since the impulse response waveform and the transfer function has one-one relation, by transmitting only a factor of the transfer function to the temperature controller 3, the response waveform can be transferred with less information.

In the case of the impulse response g(t), when it is Laplace transformed, the transfer function $G(s)=Y(s)/U(s)$. When the input U(s) and the output Y(s) are squared, the transfer function is shown by the following formula.

[Formula 3]

$$G(s) = K \frac{1 + b_1 s + b_2 s^2}{1 + a_1 s + a_2 s^2}$$

Therefore, five factors a1, a2, b1, b2 and K of the transfer function G(s) may be transferred to the temperature controller 3.

Thus, five factors a1, a2, b1, b2 and K are found from the addition waveform of the SP generated by the personal computer 4 and these five factors a1, a2, b1, b2 and K are transmitted to the temperature controller 3. The temperature controller 3 regenerates the addition waveform of the SP using the transfer function defined by the five factors a1, a2, b1, b2 and K.

Thus, the data amount transmitted from the personal computer 4 to the temperature controller 3 can be reduced.

Although the optimal adjustment value is searched using the genetic algorithm in the above embodiment, any searching method such as a hill-climbing search, a simulated annealing (SA) method, or a combing search in which a possible range is finely divided and they are thoroughly searched and the like may be used.

Although the stepped response waveform is measured and the triangular response waveform is composed from the stepped response waveform in the above embodiment, as another embodiment, the target temperature may be changed in the form of the triangular waveform and the temperature at each measure point of the work is measured, that is, the triangular response waveform may be directly measured, or the pulsed response waveform may be directly measured.

Although the present invention is applied to the heating process using the heater and the like in the above embodiment, the present invention may be applied to a cooling process using a peltiert device or cooling device and the like, or may be applied to a temperature control for both cooling and heating.

Furthermore, the present invention is not limited to the temperature control and it may be applied to control of another physical state such as a pressure, flow rate, speed or liquid level.

The present invention can be useful in temperature control in a heat treatment of a target object such as a work.

What is claimed is:

1. A control method for controlling a physical state of a processing device for processing a target object so that the target object reaches a desired physical state, wherein the processing device is comprised of a plurality of channels each configured to apply a physical parameter to the target object at a location, and a measure point is located at each of the locations which is configured to measure a physical state of the target object at the location, comprising the steps of:
    finding electronically sets of relation information showing a relation between a physical parameter applied through one or more channels of the processing device and an actual physical state of the target object through the measure points, wherein the sets of relation information is based on a physical state change of the target object at the measure points when physical parameters are applied through the channels of the processing device;
    finding electronically physical state distribution information of the target object based on measured physical states of the target object at the measure points before application of physical parameters through the channels of the processing device;
    storing electronically the sets of relation information into at least one interference matrix; and
    finding electronically sets of adjustment information based on the sets of relation information stored in the at least one interference matrix and the physical state distribution information of the target object; and
    applying physical parameters through the channels of the processing device so that the target object reaches the desired physical state based on the adjustment information.

2. The control method of claim 1, wherein the physical state is temperature, and the physical parameter is heat.

3. The control method according to claim 2, wherein finding the sets of relation information comprises creating a stepped response waveform of measured temperatures of the target object at the measure points in response to stepwise application of heat through the channels of the processing device, and using the measured stepped response waveform to compose a pulsed response waveform of the target object temperature in response to pulsed application of heat through the channels of the processing device.

4. The control method according to claim 3, wherein finding the sets of relation information comprises creating a plurality of temporally different stepped response waveforms of measured temperatures of the target object at the measure points in response to stepwise application of heat through the channels of the processing device.

5. The control method according to claim 4, wherein finding the sets of relation information comprises using the plurality of temporally different stepped response waveforms to compose a plurality of temporally different pulsed response waveforms of measured temperatures of the target object at the measure points in response to pulsed application of heat through the channels of the processing device.

6. The control method according to claim 5, wherein
    the sets of adjustment information are comprised of adjustment values, and finding adjustment information comprises calculating adjustment values based on an inverse matrix of the at least one interference matrix and the temperature distribution information, and the heat applied through each of the channels of the processing device is a predetermined point.

7. The control method according to claim 6, wherein
    finding the sets of adjustment information comprises randomly changing adjustment values and searching for optimal adjustment values by a searching method using an evaluation formula including the at least one interference matrix.

8. The control method according to claim 4, wherein finding the sets of relation information comprises using the plurality of stepped response waveforms to compose a plurality of temporally different triangular response waveforms of measured temperatures of the target object at the measure points in response to triangular application of heat through the channels of the processing device.

9. The control method according to claim 4, wherein finding the sets of relation information comprises using the plurality of stepped response waveforms to compose a plurality of temporally different pulsed response waveforms of measured temperatures of the target object at the measure points in response to pulsed application of heat through the channels of the processing device, and a plurality of temporally different triangular response waveforms of measured temperatures of the target object at the measure points in response to triangular application of heat through the channels of the processing device.

10. The control method according to claim 2, wherein
    finding the sets of relation information comprises creating a pulsed response waveform of measured temperatures of the target object at the measure points in response to pulsed application of heat through the channels of the processing device.

11. The control method of claim 2, wherein finding the sets of relation information comprises creating a stepped response waveform of measured temperatures of the target object at the measure points in response to stepwise application of heat through the channels of the processing device, and using the measured stepped response waveform to compose a triangular response waveform of the target object temperature in response to triangular application of heat through the channels of the processing device.

12. The control method according to claim 2, wherein finding the sets of relation information comprises creating a triangular response waveform of measured temperatures of the target object at the measure points in response to triangular application of heat through the channels of the processing device.

13. An adjustment device for controlling a temperature of a processing device for processing a target object so that the target object reaches a desired temperature, wherein the processing device is comprised of a plurality of channels each configured to apply heat to the target object at a location, and a measure point is located at each of the locations which is configured to measure a temperature of the target object at the location, configured to find sets of adjustment information for a temperature controller for adjusting heat applied through the plurality of channels of the processing device, and comprising a calculating device configured to calculate the sets of adjustment information for adjusting the heat applied through the plurality of channels such that the target object reaches the desired temperature, using sets of relation information stored in at least one interference matrix showing a relation between the heat applied through the plurality of channels and the temperature of the target object at the measure points.

14. The adjustment device according to claim 13, wherein the temperature controller controls heat applied at each of the channels of the processing device based on deviation between the heat applied at each of the channels of the processing device and a detected temperature detected at each of the measure points, and adjusts at least one of the heats applied at each of the channels of the processing device and the detected temperature detected at each of the measure points according to the sets of adjustment information.

15. The adjustment device according to claim 13, wherein the calculating device calculates the sets of adjustment information based on the sets of relation information and temperature distribution information of the target object before adjustment of heat through the channels of the processing device.

16. The adjustment device according to claim 15, wherein the first calculating unit is configured to create a plurality of temporally different stepped response waveforms of measured temperatures of the target object at the measure points when heat applied through the plurality of channels is changed stepwise.

17. The adjustment device according to claim 16, wherein the first calculating unit is configured to use the plurality of temporally different stepped response waveforms to compose a plurality of temporally different pulsed response waveforms of measured temperatures of the target object at the measure points in response to pulsed application of heat through the channels of the processing device.

18. The adjustment device according to claim 17, wherein the sets of adjustment information are comprised of adjustment values, and the calculating device calculates the adjustment values based on an inverse matrix of the at least one interference matrix and the temperature distribution information, and the heat applied through each channel of the processing device is a predetermined value.

19. The adjustment device according to claim 18, wherein the calculating device is configured to calculate the adjustment values by randomly changing the adjustment values, and searching for optimal adjustment values by a searching method using an evaluation formula including the at least one interference matrix.

20. The adjustment device according to claim 16, wherein the first calculating unit is configured to use the plurality of temporally different stepped response waveforms to compose a plurality of temporally different triangular response waveforms of measured temperatures of the target object at the measure points in response to triangular application of heat through the channels of the processing device.

21. The adjustment device according to claim 16, wherein the first calculating unit is configured to use the plurality of temporally different stepped response waveforms to compose a plurality of temporally different pulsed response waveforms of measured temperatures of the target object at the measure points in response to pulsed application of heat through the channels of the processing device, and to compose a plurality of temporally different triangular response waveforms of measured temperatures of the target object at the measure points in response to triangular application of heat through the channels of the processing device.

22. The adjustment device according to claim 15, wherein the temperature distribution information is set as corresponding set information and the calculating device calculates the adjustment information based on the relation information and the corresponding set information.

23. The adjustment device according to claim 15, wherein the calculating device comprises a first calculating unit for calculating the sets of relation information showing a relation between the heat applied through the plurality of channels and temperatures of the target object at the measure points based on a stepped response waveform of measured temperatures of the target object at the measure points when heat applied through the plurality of channels is changed stepwise, and a second calculating unit for calculating the temperature distribution information based on measured temperatures of the target object at the measure points before adjustment of the heat applied through the plurality of channels.

24. The adjustment device according to claim 23, wherein the first calculating unit uses the stepped response waveform to compose a pulsed response waveform of the target object temperature at the measure points in response to pulsed application of heat through the channels of the processing device.

25. The adjustment device according to claim 23, wherein the first calculating unit creates a pulsed response waveform of the target object temperature at the measure points when heat applied through the plurality of channels is individually changed into the form of a pulse.

26. The adjustment device according to claim 23, wherein the desired temperature is a state in which a variation in measured temperatures of the target object at the measure points is prevented, and the target object is put on the processing device and a heat treatment is performed.

27. The adjustment device according to claim 23, wherein the first calculating unit uses the stepped response waveform to compose a triangular response waveform of the target object temperature at the measure points in response to triangular application of heat through the channels of the processing device.

28. The adjustment device according to claim 23, wherein the first calculating unit creates a triangular response waveform of the target object temperature at the measure points when heat applied through the plurality of channels is individually changed into the form of a triangle.

29. An adjustment device for controlling a temperature of a processing device for processing a target object so that the target object reaches a desired temperature, wherein the processing device is comprised of a plurality of channels each configured to apply heat to the target object at a location, and a measure point is located at each of the locations which is configured to measure a temperature of the target object at the location, configured to find sets of adjustment information for a temperature controller for adjusting heat applied at each of the channels of the processing device, and comprising a calculating device configured to calculate the sets of adjustment information for adjusting heat applied at each of the channels of the processing device such that the target object reaches the desired temperature, based on measured temperatures of the target object at the measure points when heat applied at each of the channels of the processing device is changed stepwise and measured temperatures of the target object at the measure points before adjustment of the heat applied at each of the channels of the processing device.

30. An adjustment device for controlling a temperature of a processing device for processing a target object so that the target object reaches a desired temperature, wherein the processing device is comprised of a plurality of channels each configured to apply heat to the target object at a location, and a measure point is located at each of the locations which is configured to measure a temperature of the target object at the location, configured to find sets of adjustment information for adjusting an operation amount applied to the processing device comprising applying heat through the channels of the processing device so that the temperature of the target object reaches the desired temperature according to the sets of adjustment information, and comprising
 a calculating device configured to calculate the sets of adjustment information using sets of relation information stored in at least one interference matrix showing a relation between the operation amount and the temperature of the target object.

31. A temperature adjustment device for a temperature of a processing device for processing a target object so that the target object reaches a desired temperature, wherein the processing device is comprised of a plurality of channels each configured to apply heat to the target object at a location, and a measure point is located at each of the locations which is configured to measure a temperature of the target object at the location, configured to find sets of adjustment information for a temperature controller for adjusting heat applied through a plurality of channels of the processing device, and comprising a calculating device configured to calculate the sets of adjustment information for adjusting heat applied through the plurality of channels such that the target object reaches a desired temperature, using sets of relation information stored in at least one interference matrix showing a relation between the heat applied through the plurality of channels and the temperature of the target object at the measure points.

32. A temperature adjustment device for a temperature of a processing device for processing a target object so that the target object reaches a desired temperature wherein the processing device is comprised of a plurality of channels each configured to apply heat to the target object at a location, and a measure point is located at each of the locations which is configured to measure a temperature of the target object at the location, configured to adjust heat applied through a plurality of channels of the processing device according to sets of adjustment information, and comprising
 a calculating device configured to calculate the sets of adjustment information for adjusting the temperature of the target object to the desired temperature state by applying heat through the plurality of channels of the processing device, using sets of relation information stored in at least one interference matrix showing a relation between the heat applied at each of the channels of the processing device and the temperature of the target object.

33. A computer-readable medium comprising computer-readable code embodied therein for causing a computer to cause an adjustment device to control a temperature of a processing device for processing a target object so that the target object reaches a desired temperature wherein the processing device is comprised of a plurality of channels each configured to apply heat to the target object at a location, and a measure point is located at each of the locations which is configured to measure a temperature of the target object at the location, and by causing an adjustment device to find sets of adjustment information for a temperature controller for adjusting heat applied through a plurality of channels of the processing device according to the sets of the adjustment information, and the code further causing the computer to execute a method comprising:
 calculating by computer the sets of adjustment information for adjusting the temperature of the target object to the desired temperature by applying heat through the plurality of channels of the processing device based on measured temperatures of the target object at the measure points when heat applied through the plurality of channels of the processing device is changed stepwise and measured temperatures of the target object at the measure points before adjustment of the heat applied through the plurality of channels of the processing device.

34. A heat treatment operating device for heating and/or cooling a processing device by an output of a temperature controller, wherein the processing device is comprised of a plurality of channels each configured to apply heat to the target object at a location, and a measure point is located at each of the locations which is configured to measure a temperature of the target object at the location, wherein the temperature controller is configured to find sets of adjustment information for the temperature controller for adjusting the heat applied through a plurality of channels of the processing device, and comprising a temperature detecting device for detecting the temperatures of the target object at a plurality of detection points, and a calculating device for calculating the sets of adjustment information for adjusting the heat applied through the plurality of channels of the processing device such that the target object reaches a desired temperature by applying heat through the channels of the processing device, using sets of relation information stored in at least one interference matrix showing a relation between the heat applied through the plurality of channels and the temperature of the target object at the measure points.

35. A computer-readable medium comprising computer-readable code embodied therein for causing a computer to cause an adjustment device to control a temperature of a processing device for processing a target object so that the target object reaches a desired temperature wherein the processing device is comprised of a plurality of channels each configured to apply heat to the target object at a location, and a measure point is located at each of the locations which is configured to measure a temperature of the target object at the location, by causing the adjustment device to find sets of adjustment information for a temperature controller for adjusting heat applied through a plurality of channels of the processing device according to the sets of adjustment information, and the code further causing the computer to execute a method comprising:
 calculating by computer sets of relation information showing a relation between the heat applied at each of the channels of the processing device and the temperature of the target object, and calculating by computer the sets of adjustment information for adjusting the temperature of the target object to the desired temperature by applying heat through each of the plurality of channels of the processing device based on the sets of relation information and temperature distribution information of the target object before adjustment of the heat applied at each of the channels of the processing device.

36. The computer-readable medium according to claim 35, wherein the temperature distribution information is set as corresponding set information, and the method step of calculating the sets of adjustment information comprises calculating the sets of adjustment information based on the sets of relation information and the corresponding set information.

37. The computer-readable medium according to claim 35, wherein
the method step of calculating the sets of relation information showing the relation between the heat applied through the plurality of channels of the processing device and the temperatures of the target object at the plurality of measuring points comprises calculating information based on measured temperatures of the target object at the measure points when heat applied at each of the channels of the processing device is changed stepwise, and
the method step of calculating the sets of adjustment information comprises determining the temperature distribution information based on measured temperatures of the target object at the measure points before adjustment of the heat applied at each of the channels of the processing device.

38. The computer-readable medium according to claim 37, wherein the method step of calculating the sets of relation information comprises creating a plurality of temporally different stepped response waveforms of measured temperatures of the target object at the measure points in response to stepwise application of heat through the channels of the processing device.

39. The computer-readable medium according to claim 38, wherein the method step of calculating the sets of relation information comprises using the plurality of temporally different stepped response waveforms to compose a plurality of temporally different pulsed response waveforms of measured temperatures of the target object at the measure points in response to pulsed application of heat through the channels of the processing device.

40. The computer-readable medium according to claim 39, wherein
the sets of adjustment information are comprised of adjustment values, and the method step of calculating the sets of adjustment information comprises calculating adjustment values based on an inverse matrix of the at least one interference matrix and the temperature distribution information, and the heat applied through each channel of the processing device is a predetermined value.

41. The computer-readable medium according to claim 40, wherein
the method step of calculating the sets of adjustment information comprises calculating adjustment values by changing the adjustment values randomly and searching for optimal adjustment values by a searching method using an evaluation formula including the at least one interference matrix.

42. The temperature control method according to claim 38, wherein the method step of calculating the sets of relation information comprises using the plurality of stepped response waveforms to compose a plurality of temporally different triangular response waveforms of measured temperatures of the target object at the measure points in response to triangular application of heat through the channels of the processing device.

43. The temperature control method according to claim 38, wherein
the method step of calculating the sets of relation information comprises using the plurality of stepped response waveforms to compose a plurality of temporally different pulsed response waveforms of measured temperatures of the target object at the measure points in response to pulsed application of heat through the channels of the processing device, and to compose a plurality of temporally different triangular response waveforms of measured temperatures of the target object at the measure points in response to triangular application of heat through the channels of the processing device.

44. The computer-readable medium according to claim 37, wherein
the method step of calculating the sets of relation information comprises composing a pulsed response waveform of measured temperatures of the target object at the measure points in response to pulsed application of heat through the channels of the processing device, using a stepped response waveform of measured temperatures of the target object at the measure points when heat applied at each of the channels of the processing device is individually changed stepwise.

45. The computer-readable medium according to claim 37, wherein
the method step of calculating the sets of relation information comprises creating a pulsed response waveform of measured temperatures of the target object at the measure points in response to pulsed application of heat through the channels of the processing device.

46. The computer-readable medium according to claim 37, wherein the desired temperature is a state in which a variation in measured temperatures of the target object at the measure points is prevented, and the target object is put on the processing device and a heat treatment is performed.

47. The computer-readable medium according to claim 37, wherein the method step of calculating the sets of relation information comprises composing a triangular response waveform of measured temperatures of the target object at the measure points in response to triangular application of heat through the channels of the processing device, using a stepped response waveform of measured temperatures of the target object at the measure points when heat applied at each of the channels of the processing device is individually changed stepwise.

48. The computer-readable medium according to claim 37, wherein the method step of calculating the sets of relation information comprises creating a triangular response waveform of measured temperatures of the target object at the measure points in response to triangular application of heat through the channels of the processing device.

* * * * *